United States Patent
Zhao et al.

(10) Patent No.: US 11,323,746 B2
(45) Date of Patent: May 3, 2022

(54) CONTEXT MODELING METHOD AND APPARATUS OF SPLIT FLAG

(71) Applicant: HUAWEI TECHNOLOGIES CO., LTD., Guangdong (CN)

(72) Inventors: Yin Zhao, Hangzhou (CN); Haitao Yang, Shenzhen (CN); Jianle Chen, Santa Clara, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/021,259

(22) Filed: Sep. 15, 2020

(65) Prior Publication Data

US 2020/0413103 A1 Dec. 31, 2020

Related U.S. Application Data

(63) Continuation of application No. PCT/CN2019/077782, filed on Mar. 12, 2019.

(30) Foreign Application Priority Data

Mar. 16, 2018 (CN) .......................... 201810219551.5
Sep. 21, 2018 (CN) .......................... 201811109475.9

(51) Int. Cl.
*H04N 19/96* (2014.01)
*H04N 19/70* (2014.01)
(Continued)

(52) U.S. Cl.
CPC ............. *H04N 19/70* (2014.11); *H04N 19/13* (2014.11); *H04N 19/186* (2014.11); *H04N 19/96* (2014.11)

(58) Field of Classification Search
CPC ...... H04N 19/70; H04N 19/13; H04N 19/186; H04N 19/96
(Continued)

(56) References Cited

U.S. PATENT DOCUMENTS 9,924,190 B2 * 3/2018 Sekiguchi .............. H04N 19/30
11,089,339 B2 * 8/2021 Chuang ................ H04N 19/119
(Continued)

FOREIGN PATENT DOCUMENTS

CN 1681330 A 10/2005
CN 1996921 A 7/2007
(Continued)

OTHER PUBLICATIONS

ITU-T H.265(Feb. 2018), Series H: Audiovisual and Multimedia Systems Infrastructure of audiovisual services—Coding of moving video, High efficiency video coding, Feb. 2018. total 692 pages.
(Continued)

*Primary Examiner* — Albert Kir

(57) ABSTRACT

A context modeling method and apparatus of a split flag are provided. The method includes: obtaining a height and a width of a current node, a height of a first leaf node in a first direction, and a width of a second leaf node in a second direction; determining whether the current node meets a first preset condition and a second preset condition, where the first preset condition includes the height of the current node is greater than the height of the first leaf node, and the second preset condition includes the width of the current node is greater than the width of the second leaf node; and determining a context model of a split flag of the current node based on whether the first and second preset conditions are met.

21 Claims, 14 Drawing Sheets

(51) Int. Cl.
  *H04N 19/186* (2014.01)
  *H04N 19/13* (2014.01)
(58) Field of Classification Search
  USPC .................................................. 375/240.02
  See application file for complete search history.

(56) References Cited

U.S. PATENT DOCUMENTS

| | | | |
|---|---|---|---|
| 2006/0047501 A1 | 3/2006 | Seroussi et al. | |
| 2012/0026020 A1 | 2/2012 | Korodi et al. | |
| 2013/0188719 A1 | 7/2013 | Chen et al. | |
| 2013/0329788 A1 | 12/2013 | Song et al. | |
| 2018/0070110 A1 | 3/2018 | Chuang et al. | |
| 2018/0332288 A1* | 11/2018 | Hsiang | H04N 19/159 |
| 2019/0246107 A1* | 8/2019 | Leleannec | H04N 19/136 |
| 2020/0014928 A1* | 1/2020 | Hsiang | H04N 19/13 |
| 2020/0077099 A1* | 3/2020 | Ikai | H04N 19/157 |

FOREIGN PATENT DOCUMENTS

| | | |
|---|---|---|
| CN | 102783154 A | 11/2012 |
| CN | 103650503 A | 3/2014 |
| CN | 104853220 A | 8/2015 |
| CN | 105357539 A | 2/2016 |
| CN | 107005718 A | 8/2017 |
| EP | 3557873 A1 | 10/2019 |
| WO | 2017157249 A1 | 9/2017 |

OTHER PUBLICATIONS

Jianle Chen et al. Algorithm Description of Joint Exploration Test Model 7 (JEM 7), Joint Video Exploration Team (JVET) of ITU-T SG 16 WP 3 and ISO/IEC JTC 1/SC 29/WG 11, JVET-G1001-v1, 7th Meeting: Torino, IT, Jul. 13-21, 2017. total 48 pages.

* cited by examiner

CONTEXT MODELING METHOD AND APPARATUS OF SPLIT FLAG

CROSS-REFERENCE TO RELATED DISCLOSURES

This disclosure is a continuation of International Disclosure No. PCT/CN2019/077782, filed on Mar. 12, 2019, which claims priority to Chinese Patent Disclosure No. 201811109475.9, filed on Sep. 21, 2018 and Chinese Patent Disclosure No. 201810219551.5, filed on Mar. 16, 2018. The disclosures of the aforementioned applications are hereby incorporated by reference in their entireties.

TECHNICAL FIELD

Embodiments of the present disclosure relate to the field of multimedia technologies, and in particular, to a context modeling method and apparatus of a split flag.

BACKGROUND

A split flag is an important syntax element in the field of video encoding and video decoding. The split flag may be used to indicate whether a node in a coding tree is further split into smaller child nodes. Encoding and decoding of the split flag are inseparable in a video encoding and video decoding process.

Currently, encoding and decoding of a split flag may be implemented by using an entropy coding technology. Specifically, a probability value of a bin is determined based on a probability model of the bin corresponding to the split flag, and then the probability value of the bin is encoded and decoded. In this way, the split flag is encoded and decoded. An example in which a quadtree method is used for splitting a coding tree unit (CTU) during encoding or decoding is used. A process of determining the probability model of the bin corresponding to the split flag (which may also be referred to as a method for determining a context model of the split flag) is as follows: First, a quadtree depth of a current node (namely, a coding tree depth of the current node, which may also be referred to as a quadtree depth of the current node in the H.265 standard), a quadtree depth of a left-side leaf node of the current node, and a quadtree depth of an upper-side leaf node of the current node are obtained, where the left-side leaf node and the upper-side leaf node of the current node are reconstructed nodes. Then, it is determined whether the quadtree depth of the current node is less than the quadtree depth of the left-side leaf node, and it is determined whether the quadtree depth of the current node is less than the quadtree depth of the upper-side leaf node. Finally, the probability model of the bin corresponding to the current node is determined based on determining results of the foregoing two determining steps, that is, a index of the context model of the current node is determined.

However, in the foregoing method, when a binary tree split method and/or a ternary tree split method are/is used, because a height of a node is not necessarily equal to a width of the node, whether the current node can be further split cannot be accurately determined based on a method whether a coding tree depth of the current node is less than a depth of an adjacent leaf node (for example, the left-side leaf node or the upper-side leaf node).

In conclusion, it can be learned that the context model of the current node determined by using the foregoing method has comparatively low accuracy. Consequently, encoding or decoding efficiency of the split flag is comparatively low.

SUMMARY

This disclosure provides a context modeling method and apparatus of a split flag, to more accurately determine a context model of the split flag, and improve efficiency of entropy coding of the split flag.

To achieve the foregoing objective, the following technical solutions are used in this disclosure.

According to a first aspect, a context modeling method of a split flag is provided, applied to a video encoding device or a video decoding device. The method includes: obtaining a height and a width of a current node, a height of a first leaf node adjacent to the current node in a first direction, and a width of a second leaf node adjacent to the current node in a second direction, where the first direction is perpendicular to the second direction, and the first leaf node and the second leaf node are reconstructed leaf nodes; determining whether the current node meets a first preset condition and a second preset condition, where the first preset condition is that the height of the current node is greater than the height of the first leaf node, and the second preset condition is that the width of the current node is greater than the width of the second leaf node; and determining a context model of a split flag of the current node based on whether the first preset condition and the second preset condition are met, where the first direction is perpendicular to the second direction, the first leaf node and the second leaf node are reconstructed leaf nodes, and the context model of the split flag is a probability model of a bin corresponding to the split flag.

The first leaf node covers a preset position in the first direction of the current node, and the second leaf node covers a preset position in the second direction of the current node.

According to the context modeling method of the split flag provided in this disclosure, whether the current node is to be further split can be more accurately determined by comparing the height of the current node with the height of the first leaf node and comparing the width of the current node with the width of the second leaf node. In this way, the context model of the split flag can be more accurately determined based on whether the foregoing two preset conditions are met, and efficiency of entropy coding of the split flag can be improved.

Further, when a binary tree split method and/or ternary tree split method are/is used for splitting any node, the height of the current node may be compared with the height of the first leaf node, and the width of the current node may be compared with the width of the second leaf node. In this way, the context model of the split flag of the current node is determined more accurately. In this way, a prior-art problem that a context model, determined based on depth information, of the split flag of the current node is inaccurate can be well resolved. For example, when a depth of the current node is the same as a depth of the first leaf node, but the height of the current node is far greater than the height of the first leaf node, it is more likely to determine that the current node does not need to be further split in the prior art. Actually, because the height of the current node is comparatively large, there is a comparatively high probability that the current node should be further horizontally split.

In a first optional implementation of the first aspect, there are N context models of the split flag, indexes of the N context models are sequentially 0 to N−1, and N is an integer greater than 1. The method for determining a context model of a split flag of the current node based on whether the first preset condition and the second preset condition are met specifically includes: determining a index of the context model of the split flag of the current node based on whether the first preset condition and the second preset condition are met, where the index of the context model of the split flag meets: ctxInc=n_conL+n_conA, where ctxInc represents the index of the context model of the split flag; n_conL represents whether the first preset condition is met, where when n_conL is 1, it indicates that the first preset condition is met, and when n_conL is 0, it indicates that the first preset condition is not met; and n_conA represents whether the second preset condition is met, where when n_conA is 1, it indicates that the second preset condition is met, and when n_conA is 0, it indicates that the second preset condition is not met.

In an optional implementation of the first aspect, the method for determining a context model of a split flag of the current node based on whether the first preset condition and the second preset condition are met specifically includes: determining a index of the context model of the split flag of the current node based on whether the first preset condition and the second preset condition are met, where the index of the context model of the split flag meets: ctxInc=n_conL+n_conA, where ctxInc represents the index of the context model of the split flag; n_conL represents whether the first preset condition is met, where when n_conL is 1, it indicates that the first preset condition is met, and when n_conL is 0, it indicates that the first preset condition is not met; and n_conA represents whether the second preset condition is met, where when n_conA is 1, it indicates that the second preset condition is met, and when n_conA is 0, it indicates that the second preset condition is not met.

In a second optional implementation of the first aspect, before the determining a context model of a split flag of the current node based on whether the first preset condition and the second preset condition are met, the context modeling method of the split flag provided in this disclosure further includes: determining a subset index of the context model of the split flag based on the height and the width of the current node.

The method for determining a context model of a split flag of the current node based on whether the first preset condition and the second preset condition are met includes: determining the context model of the split flag of the current node based on whether the first preset condition and second preset condition are met and the subset index of the context model of the split flag.

In a third optional implementation of the first aspect, the method for determining a subset index of the context model of the split flag based on the height and the width of the current node includes: obtaining an area of the current node based on the height and the width of the current node, and then determining the subset index of the context model of the split flag based on a preset mapping relationship between a node area and a subset index; or querying a preset subset index query table for the subset index of the context model of the split flag based on the height and the width of the current node, where the subset index query table includes the height and the width of the current node and the subset index corresponding to the width and the height of the current node.

In a fourth optional implementation of the first aspect, there are N context models of the split flag, indexes of the N context models are sequentially 0 to N−1, and N is an integer greater than 1. The method for determining the context model of the split flag of the current node based on whether the first preset condition and the second preset condition are met and the subset index of the context model of the split flag includes: determining a index of the context model of the current node based on whether the first preset condition and the second preset condition are met and the subset index of the context model of the split flag, where the index of the context model of the split flag meets: ctxInc=n_conL+n_conA+X*A, where ctxInc represents the index of the context model of the split flag; n_conL represents whether the first preset condition is met, where when n_conL is 1, it indicates that the first preset condition is met, and when n_conL is 0, it indicates that the first preset condition is not met; n_conA represents whether the second preset condition is met, where when n_conA is 1, it indicates that the second preset condition is met, and when n_conA is 0, it indicates that the second preset condition is not met; X represents the subset index of the context model of the split flag; A represents a quantity of context models of the split flag that correspond to the subset index; and * represents multiplication.

In a fourth optional implementation of the first aspect, the method for determining the context model of the split flag of the current node based on whether the first preset condition and the second preset condition are met and the subset index of the context model of the split flag includes: determining a index of the context model of the current node based on whether the first preset condition and the second preset condition are met and the subset index of the context model of the split flag, where the index of the context model of the split flag meets: ctxInc=n_conL+n_conA+X*A, where ctxInc represents the index of the context model of the split flag; n_conL represents whether the first preset condition is met, where when n_conL is 1, it indicates that the first preset condition is met, and when n_conL is 0, it indicates that the first preset condition is not met; n_conA represents whether the second preset condition is met, where when n_conA is 1, it indicates that the second preset condition is met, and when n_conA is 0, it indicates that the second preset condition is not met; X represents the subset index of the context model of the split flag; A represents a quantity of context models of the split flag that correspond to the subset index; and * represents multiplication.

In this disclosure, the subset index of the split flag of the current node may be determined based on a size of the current node, and the context model, of the split flag, determined based on both whether the first preset condition and the second preset condition are met and the subset index of the context model of the split flag is comparatively accurate. This can further improve efficiency of entropy coding of the split flag.

In a fifth optional implementation of the first aspect, before the determining a context model of a split flag of the current node based on whether the first preset condition and the second preset condition are met, the context modeling method of the split flag provided in this disclosure further includes: obtaining a height of a third leaf node adjacent to the current node in a third direction, where the third direction is opposite to the first direction, and the third leaf node is a reconstructed leaf node; determining whether the current node meets a third preset condition, where the third preset condition is that the height of the current node is greater than the height of the third leaf node.

The method for determining a context model of a split flag of the current node based on whether the first preset condition and the second preset condition are met includes: determining the context model of the split flag of the current node based on whether the first preset condition, the second preset condition, and the third preset condition are met.

In a sixth optional implementation of the first aspect, there are N context models of the split flag, indexes of the N context models are sequentially 0 to N−1, and N is an integer greater than 1. The method for determining the context model of the split flag of the current node based on whether the first preset condition, the second preset condition, and the third preset condition are met includes: determining a index of the context model of the current node based on whether the first preset condition, the second preset condition, and the third preset condition are met, where the index of the context model of the split flag meets: ctxInc=min (n_conL+n_conA+n_conR, N−1), where ctxInc represents the index of the context model of the split flag; n_conL represents whether the first preset condition is met, where when n_conL is 1, it indicates that the first preset condition is met, and when n_conL is 0, it indicates that the first preset condition is not met; n_conA represents whether the second preset condition is met, where when n_conA is 1, it indicates that the second preset condition is met, and when n_conA is 0, it indicates that the second preset condition is not met; and n_conR represents whether the third preset condition is met, where when n_conR is 1, it indicates that the third preset condition is met, and when n_conR is 0, it indicates that the third preset condition is not met.

In this disclosure, whether the current node meets the third preset condition may be determined based on another leaf node adjacent to the current node, and the context model, of the split flag, determined based on both whether the first preset condition and the second preset condition are met and whether the third preset condition is met is comparatively accurate. This can further improve efficiency of entropy coding of the split flag.

In a seventh optional implementation of the first aspect, the context modeling method of the split flag provided in this disclosure may further include: determining a subset index of the context model of the split flag based on the height and the width of the current node.

The method for determining a context model of a split flag of the current node based on whether the first preset condition and the second preset condition are met includes: determining the context model of the split flag of the current node based on whether the first preset condition, the second preset condition, and the third preset condition are met and the subset index of the context model of the split flag.

In an eighth optional implementation of the first aspect, the method for determining the context model of the split flag of the current node based on whether the first preset condition, the second preset condition, and the third preset condition are met and the subset index of the context model of the split flag includes: determining a index of the context model of the current node based on whether the first preset condition, the second preset condition, and the third preset condition are met and the subset index of the context model of the split flag, where the index of the context model of the split flag meets: ctxInc=min(n_conL+n_conA+n_conR, N−1)+X*A, where ctxInc represents the index of the context model of the split flag; n_conL represents whether the first preset condition is met, where when n_conL is 1, it indicates that the first preset condition is met, and when n_conL is 0, it indicates that the first preset condition is not met; n_conA represents whether the second preset condition is met, where when n_conA is 1, it indicates that the second preset condition is met, and when n_conA is 0, it indicates that the second preset condition is not met; n_conR represents whether the third preset condition is met, where when n_conR is 1, it indicates that the third preset condition is met, and when n_conR is 0, it indicates that the third preset condition is not met; X represents the subset index of the context model of the split flag; A represents a quantity of context models of the split flag that correspond to the subset index; and * represents multiplication.

In this disclosure, the subset index of the split flag of the current node may be determined based on the size of the current node, and the third preset condition is determined based on the another leaf node adjacent to the current node. The context model, of the split flag, determined based on both whether the first preset condition, the second preset condition, and the third preset condition are met and the subset index of the context model of the split flag is more accurate. This can significantly improve efficiency of entropy coding of the split flag.

In an optional implementation of the first aspect, the first preset condition further includes that the first leaf node is available; or the second preset condition further includes that the second leaf node is available.

In an optional implementation of the first aspect, a coding tree to which the current node belongs is a luma coding tree or a luma-chroma joint tree.

According to a second aspect, a context modeling apparatus of a split flag is provided. The apparatus includes an obtaining module, a condition determining module, and a context model determining module. The obtaining module is configured to obtain a height and a width of a current node, a height of a first leaf node adjacent to the current node in a first direction, and a width of a second leaf node adjacent to the current node in a second direction, where the first direction is perpendicular to the second direction, and the first leaf node and the second leaf node are reconstructed leaf nodes. The condition determining module is configured to determine whether the current node meets a first preset condition and a second preset condition, where the first preset condition is that the height of the current node is greater than the height of the first leaf node, and the second preset condition is that the width of the current node is greater than the width of the second leaf node. The context model determining module is configured to determine a context model of a split flag of the current node based on whether the first preset condition and the second preset condition are met, where the context model of the split flag is a probability model of a bin corresponding to the split flag.

The first leaf node covers a preset position in the first direction of the current node, and the second leaf node covers a preset position in the second direction of the current node.

In a first optional implementation of the second aspect, there are N context models of the split flag, indexes of the N context models are sequentially 0 to N−1, and N is an integer greater than 1. The context model determining module is specifically configured to determine a index of the context model of the split flag of the current node based on whether the first preset condition and the second preset condition are met, where the index of the context model of the split flag meets: ctxInc=n_conL+n_conA, where ctxInc represents the index of the context model of the split flag; n_conL represents whether the first preset condition is met, where when n_conL is 1, it indicates that the first preset condition is met, and when n_conL is 0, it indicates that the first preset condition is not met; and n_conA represents whether the second preset condition is met, where when n_conA is 1, it indicates that the second preset condition is met, and when n_conA is 0, it indicates that the second preset condition is not met.

In a second optional implementation of the second aspect, the condition determining module is further configured to: before the context model determining module determines the context model of the split flag of the current node based on whether the first preset condition and the second preset condition are met, determine a subset index of the context model of the split flag based on the height and the width of the current node; and the context model determining module is specifically configured to determine the context model of the split flag of the current node based on whether the first preset condition and the second preset condition are met and the subset index of the context model of the split flag.

In a third optional implementation of the second aspect, the context model determining module is specifically configured to: obtain an area of the current node based on the height and the width of the current node, and then determine the subset index of the context model of the split flag based on a preset mapping relationship between a node area and a subset index; or the context model determining module is specifically configured to query a preset subset index query table for the subset index of the context model of the split flag based on the height and the width of the current node, where the subset index query table includes the height and the width of the current node and the subset index corresponding to the width and the height of the current node.

In a fourth optional implementation of the second aspect, there are N context models of the split flag, indexes of the N context models are sequentially 0 to N−1, and N is an integer greater than 1. The context model determining module is specifically configured to determine a index of the context model of the split flag of the current node based on whether the first preset condition and the second preset condition are met and the subset index of the context model of the split flag, where the index of the context model of the split flag meets: ctxInc=n_conL+n_conA+X*A, where ctxInc represents the index of the context model of the split flag; n_conL represents whether the first preset condition is met, where when n_conL is 1, it indicates that the first preset condition is met, and when n_conL is 0, it indicates that the first preset condition is not met; n_conA represents whether the second preset condition is met, where when n_conA is 1, it indicates that the second preset condition is met, and when n_conA is 0, it indicates that the second preset condition is not met; X represents the subset index of the context model of the split flag; A represents a quantity of context models of the split flag that correspond to the subset index; and * represents multiplication.

In an optional implementation of the second aspect, the context model determining module is specifically configured to determine a index of the context model of the split flag of the current node based on whether the first preset condition and the second preset condition are met and the subset index of the context model of the split flag, where the index of the context model of the split flag meets: ctxInc=n_conL+n_conA+X*A, where ctxInc represents the index of the context model of the split flag; n_conL represents whether the first preset condition is met, where when n_conL is 1, it indicates that the first preset condition is met, and when n_conL is 0, it indicates that the first preset condition is not met; n_conA represents whether the second preset condition is met, where when n_conA is 1, it indicates that the second preset condition is met, and when n_conA is 0, it indicates that the second preset condition is not met; X represents the subset index of the context model of the split flag; A represents a quantity of context models of the split flag that correspond to the subset index; and * represents multiplication.

In a fifth optional implementation of the second aspect, the obtaining module is further configured to: before the context model of the split flag of the current node is determined based on whether the first preset condition and the second preset condition are met, obtain a height of a third leaf node adjacent to the current node in a third direction, where the third direction is opposite to the first direction, and the third leaf node is a reconstructed leaf node; the condition determining module is further configured to determine whether the current node meets a third preset condition, where the third preset condition is that the height of the current node is greater than the height of the third leaf node; and the context model determining module is specifically configured to determine the context model of the split flag of the current node based on whether the first preset condition, the second preset condition, and the third preset condition are met.

In a sixth optional implementation of the second aspect, there are N context models of the split flag, indexes of the N context models are sequentially 0 to N−1, and N is an integer greater than 1. The context model determining module is specifically configured to determine a index of the context model of the split flag of the current node based on whether the first preset condition, the second preset condition, and the third preset condition are met, where the index of the context model of the split flag meets: ctxInc=min(n_conL+n_conA+n_conR, N−1), where ctxInc represents the index of the context model of the split flag; n_conL represents whether the first preset condition is met, where when n_conL is 1, it indicates that the first preset condition is met, and when n_conL is 0, it indicates that the first preset condition is not met; n_conA represents whether the second preset condition is met, where when n_conA is 1, it indicates that the second preset condition is met, and when n_conA is 0, it indicates that the second preset condition is not met; and n_conR represents whether the third preset condition is met, where when n_conR is 1, it indicates that the third preset condition is met, and when n_conR is 0, it indicates that the third preset condition is not met.

In an optional implementation of the second aspect, the context model determining module is specifically configured to determine a index of the context model of the split flag of the current node based on whether the first preset condition, the second preset condition, and the third preset condition are met, where the index of the context model of the split flag meets: ctxInc=min(n_conL+n_conA+n_conR, N−1), where ctxInc represents the index of the context model of the split flag; n_conL represents whether the first preset condition is met, where when n_conL is 1, it indicates that the first preset condition is met, and when n_conL is 0, it indicates that the first preset condition is not met; n_conA represents whether the second preset condition is met, where when n_conA is 1, it indicates that the second preset condition is met, and when n_conA is 0, it indicates that the second preset condition is not met; and n_conR represents whether the third preset condition is met, where when n_conR is 1, it indicates that the third preset condition is met, and when n_conR is 0, it indicates that the third preset condition is not met.

In a seventh optional implementation of the second aspect, the context model determining module is further configured to determine a subset index of the context model of the split flag based on the height and the width of the current node; and the context model determining module is specifically configured to determine the context model of the split flag of the current node based on whether the first preset condition, the second preset condition, and the third preset condition are met and the subset index of the context model of the split flag.

In an eighth optional implementation of the second aspect, the context model determining module is specifically configured to determine a index of the context model of the split flag of the current node based on whether the first preset condition, the second preset condition, and the third preset condition are met and the subset index of the context model of the split flag, where the index of the context model of the split flag meets: ctxInc=min(n_conL+n_conA+n_conR, N−1)+X*a, where ctxInc represents the index of the context model of the split flag; n_conL represents whether the first preset condition is met, where when n_conL is 1, it indicates that the first preset condition is met, and when n_conL is 0, it indicates that the first preset condition is not met; n_conA represents whether the second preset condition is met, where when n_conA is 1, it indicates that the second preset condition is met, and when n_conA is 0, it indicates that the second preset condition is not met; n_conR represents whether the third preset condition is met, where when n_conR is 1, it indicates that the third preset condition is met, and when n_conR is 0, it indicates that the third preset condition is not met; X represents the subset index of the context model of the split flag; a represents a quantity of context models of the split flag that correspond to the subset index; and * represents multiplication.

In an optional implementation of the second aspect, the first preset condition further includes that the first leaf node is available; or the second preset condition further includes that the second leaf node is available.

In an optional implementation of the second aspect, a coding tree to which the current node belongs is a luma coding tree or a luma-chroma joint tree.

According to a third aspect, a context modeling method of a split flag is provided, applied to a video encoding device or a video decoding device. The method includes: determining a first model index based on a width and a height of a current node, a height of a first leaf node, and a width of a second leaf node, where the first leaf node is adjacent to the current node in a first direction, the second leaf node is adjacent to the current node in a second direction, the first direction is perpendicular to the second direction, and the first leaf node and the second leaf node are reconstructed leaf nodes; determining a second model index based on a type of a coding tree to which the current node belongs; and determining a context model of a split flag of the current node based on the first model index and the second model index.

It can be learned from the foregoing that the context model of the split flag of the current node may be determined based on the type of the coding tree to which the current node belongs in this implementation, so that different context models may be used for a chroma coding tree and a non-chroma coding tree (that is, a luma coding tree or a luma-chroma joint tree). In this way, the determined context model can adapt to the chroma coding tree and the non-chroma coding tree, thereby improving compression efficiency.

With reference to the third aspect, in a possible implementation, the determining a second model index based on a type of a coding tree to which the current node belongs includes: if the coding tree to which the current node belongs is a chroma coding tree, determining that the second model index is a first value, where the first value is a preset positive integer.

With reference to the third aspect, in a possible implementation, the determining a second model index based on a type of a coding tree to which the current node belongs includes: if the coding tree to which the current node belongs is a luma coding tree or a luma-chroma joint tree, determining the second model index based on a value relationship between an MTT depth of the current node and an MTT depth threshold ThD.

With reference to the third aspect, in a possible implementation, if the MTT depth of the current node is less than the MTT depth threshold ThD, determining that the second model index is a second value, where the second value is a nonnegative integer; or if the MTT depth of the current node is greater than or equal to the MTT depth threshold ThD, determining that the second model index is a third value, where the third value is a nonnegative integer; where the first value, the second value, and the third value are different from each other.

With reference to the third aspect, in a possible implementation, the MTT depth threshold ThD is determined based on a maximum MTT depth corresponding to the current node.

With reference to the third aspect, in a possible implementation, the determining a second model index based on a type of a coding tree to which the current node belongs includes: if the coding tree to which the current node belongs is a luma coding tree or a luma-chroma joint tree, determining the second model index based on a product of an MTT depth of the current node and a preset constant P1.

With reference to the third aspect, in a possible implementation, the product is the second model index; or if the product is greater than 6, the second model index is 6.

With reference to the third aspect, in a possible implementation, the first value is greater than or equal to 9.

With reference to the third aspect, in a possible implementation, the determining a second model index based on a type of a coding tree to which the current node belongs includes: if the coding tree to which the current node belongs is a luma coding tree or a luma-chroma joint tree, determining the second model index based on a value relationship between an area of the current node and a first preset area threshold ThA1.

With reference to the third aspect, in a possible implementation, if the area of the current node is greater than the first preset area threshold ThA1, determining that the second model index is a fourth value, where the fourth value is a nonnegative integer; or if the area of the current node is less than or equal to the first preset area threshold ThA1, determining that the second model index is a fifth value, where the fifth value is a nonnegative integer; where the first value, the fourth value, and the fifth value are different from each other.

With reference to the third aspect, in a possible implementation, the determining a second model index based on a type of a coding tree to which the current node belongs includes: if the coding tree to which the current node belongs is a luma coding tree or a luma-chroma joint tree, determining the second model index based on a value relationship between an area of the current node and at least one of a second preset area threshold ThA2 and a third preset area threshold ThA3, where the second preset area threshold ThA2 is greater than the third preset area threshold ThA3.

With reference to the third aspect, in a possible implementation, if the area of the current node is greater than the second area threshold ThA2, determining that the second model index is a sixth value, where the sixth value is a nonnegative integer; if the area of the current node is greater than the third area threshold ThA3 and less than or equal to the second area threshold ThA2, determining that the second model index is a seventh value, where the seventh value is a nonnegative integer; or if the area of the current node is less than or equal to the third area threshold ThA3, determining that the second model index is an eighth value, where the eighth value is a nonnegative integer; where the first value, the sixth value, the seventh value, and the eighth value are different from each other.

With reference to the third aspect, in a possible implementation, the determining a second model index based on a type of a coding tree to which the current node belongs includes: determining the second model index based on the type of the coding tree to which the current node belongs and a value relationship between an MTT depth of the current node and an MTT depth threshold ThD.

With reference to the third aspect, in a possible implementation, if the coding tree to which the current node belongs is a chroma coding tree, and the MTT depth of the current node is less than the MTT depth threshold ThD, determining that the second model index is a ninth value, where the ninth value is a nonnegative integer; if the coding tree to which the current node belongs is a chroma coding tree, and the MTT depth of the current node is greater than or equal to the MTT depth threshold ThD, determining that the second model index is a tenth value, where the tenth value is a nonnegative integer; if the coding tree to which the current node belongs is a luma coding tree or a luma-chroma joint tree, and the MTT depth of the current node is less than the MTT depth threshold ThD, determining that the second model index is an eleventh value, where the eleventh value is a nonnegative integer; or if the coding tree to which the current node belongs is a luma coding tree or a luma-chroma joint tree, and the MTT depth of the current node is greater than or equal to the MTT depth threshold ThD, determining that the second model index is a twelfth value, where the twelfth value is a nonnegative integer; where the ninth value, the tenth value, the eleventh value, and the twelfth value are different from each other.

According to a fourth aspect, a context modeling apparatus of a split flag is provided, including: a first model index determining module, configured to determine a first model index based on a width and a height of a current node, a height of a first leaf node, and a width of a second leaf node, where the first leaf node is adjacent to the current node in a first direction, the second leaf node is adjacent to the current node in a second direction, the first direction is perpendicular to the second direction, and the first leaf node and the second leaf node are reconstructed leaf nodes; a second model index determining module, configured to determine a second model index based on a type of a coding tree to which the current node belongs; and a context model determining module, configured to determine a context model of a split flag of the current node based on the first model index and the second model index.

It can be learned from the foregoing that the context model of the split flag of the current node may be determined based on the type of the coding tree to which the current node belongs in this implementation, so that different context models may be used for a chroma coding tree and a non-chroma coding tree (that is, a luma coding tree or a luma-chroma joint tree). In this way, the determined context model can adapt to the chroma coding tree and the non-chroma coding tree, thereby improving compression efficiency.

With reference to the fourth aspect, in a possible implementation, the second model index determining module is specifically configured to: when the coding tree to which the current node belongs is a chroma coding tree, determine that the second model index is a first value, where the first value is a preset positive integer.

With reference to the fourth aspect, in a possible implementation, the second model index determining module is specifically configured to: when the coding tree to which the current node belongs is a luma coding tree or a luma-chroma joint tree, determine the second model index based on a value relationship between an MTT depth of the current node and an MTT depth threshold ThD.

With reference to the fourth aspect, in a possible implementation, the second model index determining module is specifically configured to: when the MTT depth of the current node is less than the MTT depth threshold ThD, determine that the second model index is a second value, where the second value is a nonnegative integer; or when the MTT depth of the current node is greater than or equal to the MTT depth threshold ThD, determine that the second model index is a third value, where the third value is a nonnegative integer; where the first value, the second value, and the third value are different from each other.

With reference to the fourth aspect, in a possible implementation, the MTT depth threshold ThD is determined based on a maximum MTT depth corresponding to the current node.

With reference to the fourth aspect, in a possible implementation, the second model index determining module is specifically configured to: when the coding tree to which the current node belongs is a luma coding tree or a luma-chroma joint tree, determine the second model index based on a product of an MTT depth of the current node and a preset constant P1.

With reference to the fourth aspect, in a possible implementation, the product is the second model index; or if the product is greater than 6, the second model index is 6.

With reference to the fourth aspect, in a possible implementation, the first value is greater than or equal to 9.

With reference to the fourth aspect, in a possible implementation, the second model index determining module is specifically configured to: when the coding tree to which the current node belongs is a luma coding tree or a luma-chroma joint tree, determine the second model index based on a value relationship between an area of the current node and a first preset area threshold ThA1.

With reference to the fourth aspect, in a possible implementation, the second model index determining module is specifically configured to: when the area of the current node is greater than the first preset area threshold ThA1, determine that the second model index is a fourth value, where the fourth value is a nonnegative integer; or when the area of the current node is less than or equal to the first preset area threshold ThA1, determine that the second model index is a fifth value, where the fifth value is a nonnegative integer; where the first value, the fourth value, and the fifth value are different from each other.

With reference to the fourth aspect, in a possible implementation, the second model index determining module is specifically configured to: when the coding tree to which the current node belongs is a luma coding tree or a luma-chroma joint tree, determine the second model index based on a value relationship between an area of the current node and at least one of a second preset area threshold ThA2 and a third preset area threshold ThA3, where the second preset area threshold ThA2 is greater than the third preset area threshold ThA3.

With reference to the fourth aspect, in a possible implementation, the second model index determining module is specifically configured to: when the area of the current node is greater than the second area threshold ThA2, determine that the second model index is a sixth value, where the sixth value is a nonnegative integer; when the area of the current node is greater than the third area threshold ThA3 and less than or equal to the second area threshold ThA2, determine that the second model index is a seventh value, where the seventh value is a nonnegative integer; or when the area of the current node is less than or equal to the third area threshold ThA3, determine that the second model index is an eighth value, where the eighth value is a nonnegative integer; where the first value, the sixth value, the seventh value, and the eighth value are different from each other.

With reference to the fourth aspect, in a possible implementation, the second model index determining module is specifically configured to determine the second model index based on the type of the coding tree to which the current node belongs and a value relationship between an MTT depth of the current node and an MTT depth threshold ThD.

With reference to the fourth aspect, in a possible implementation, the second model index determining module is specifically configured to: when the coding tree to which the current node belongs is a chroma coding tree, and the MTT depth of the current node is less than the MTT depth threshold ThD, determine that the second model index is a ninth value, where the ninth value is a nonnegative integer; when the coding tree to which the current node belongs is a chroma coding tree, and the MTT depth of the current node is greater than or equal to the MTT depth threshold ThD, determine that the second model index is a tenth value, where the tenth value is a nonnegative integer; when the coding tree to which the current node belongs is a luma coding tree or a luma-chroma joint tree, and the MTT depth of the current node is less than the MTT depth threshold ThD, determine that the second model index is an eleventh value, where the eleventh value is a nonnegative integer; or when the coding tree to which the current node belongs is a luma coding tree or a luma-chroma joint tree, and the MTT depth of the current node is greater than or equal to the MTT depth threshold ThD, determine that the second model index is a twelfth value, where the twelfth value is a nonnegative integer; where the ninth value, the tenth value, the eleventh value, and the twelfth value are different from each other.

In the first aspect, the second aspect, the third aspect, and the fourth aspect, the first direction is a leftward horizontal direction, and the second direction is an upward vertical direction.

According to a fifth aspect, this disclosure provides a context modeling apparatus of a split flag. The apparatus may include a processor and a memory coupled to the processor. The memory is configured to store a computer instruction. When the apparatus runs, the processor executes the computer instruction stored in the memory, so that the apparatus performs the context modeling method of the split flag according to any one of the first aspect or the optional implementations of the first aspect.

According to a sixth aspect, this disclosure provides a context modeling apparatus of a split flag. The apparatus may include a processor and a memory coupled to the processor. The memory is configured to store a computer instruction. When the apparatus runs, the processor executes the computer instruction stored in the memory, so that the apparatus performs the context modeling method of the split flag according to any one of the third aspect or the optional implementations of the third aspect.

According to a seventh aspect, this disclosure provides a computer-readable storage medium. The computer-readable storage medium includes a computer instruction. When the computer instruction is run on a computer, the computer is enabled to perform the context modeling method of the split flag according to any one of the first aspect or the optional implementations of the first aspect.

According to an eighth aspect, this disclosure provides a computer-readable storage medium. The computer-readable storage medium includes a computer instruction. When the computer instruction is run on a computer, the computer is enabled to perform the context modeling method of the split flag according to any one of the third aspect or the optional implementations of the third aspect.

According to a ninth aspect, this disclosure provides a computer program product including an instruction. When the computer program product runs on a computer, the computer is enabled to perform the context modeling method of the split flag according to any one of the first aspect or the optional implementations of the first aspect.

According to a tenth aspect, this disclosure provides a computer program product including an instruction. When the computer program product runs on a computer, the computer is enabled to perform the context modeling method of the split flag according to any one of the third aspect or the optional implementations of the third aspect.

According to an eleventh aspect, a video decoder is provided, including the context modeling apparatus according to any one of the second aspect or the optional implementations of the second aspect.

According to a twelfth aspect, a video decoder is provided, including the context modeling apparatus according to any one of the fourth aspect or the optional implementations of the fourth aspect.

According to a thirteenth aspect, a video decoder is provided, including an execution circuit configured to perform the method according to any one of the first aspect or the possible embodiments of the first aspect.

According to a fourteenth aspect, a video decoder is provided, including an execution circuit configured to perform the method according to any one of the third aspect or the possible embodiments of the third aspect.

According to a fifteenth aspect, a video encoder is provided, including an execution circuit configured to perform the method according to any one of the first aspect or the possible embodiments of the first aspect.

According to a sixteenth aspect, a video encoder is provided, including an execution circuit configured to perform the method according to any one of the third aspect or the possible embodiments of the third aspect.

For descriptions of related content and technical effects of the second aspect to the fifth aspect, refer to related descriptions of the related content and technical effects of the first aspect and the optional implementations of the first aspect. Details are not described herein again.

DESCRIPTION OF EMBODIMENTS

Figure 1A:
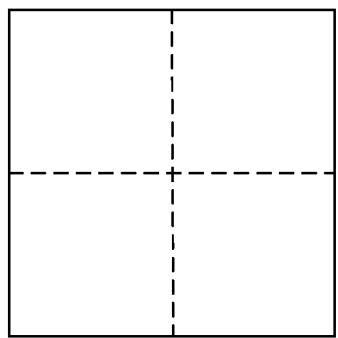
FIG. 1(a) to FIG. 1(e) are a schematic structural diagram of a node splitting result according to an embodiment of the present disclosure.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of the present disclosure, the terms "first", "second", and the like are used to distinguish between different objects but do not indicate a particular order of the objects. For example, a first direction, a second direction, and the like are used to distinguish between different directions, but are not used to describe a specific order of the directions. A first preset condition, a second preset condition, and the like are used to distinguish between different preset conditions, but are not used to describe a specific order of the preset conditions.

The term "example", "for example", or the like in the embodiments of the present disclosure is used to represent giving an example, an illustration, or a description. Any embodiment or design scheme described as an "example" or "for example" in the embodiments of the present disclosure should not be explained as being more preferred or having more advantages than another embodiment or design scheme. Exactly, use of the word such as "example" or "for example" is intended to present a relative concept in a specific manner.

In the descriptions of the embodiments of the present disclosure, unless otherwise stated, "a plurality of" means two or more. For example, a plurality of coding units means two or more coding units. A plurality of processing units means two or more processing units.

First, some concepts related to a context modeling (context modeling) method and apparatus of a split flag provided in the embodiments of the present disclosure are interpreted and described.

CTU: A coding tree unit is a basic unit in a video encoding or video decoding process. The CTU corresponds to a square picture block in a video frame (that is, a picture) in video data. In other words, a picture may include one or more CTUs. For example, a size of the CTU may be 64×64. To be specific, a 64×64 CTU includes a rectangular pixel matrix formed by 64 rows and 64 columns of pixels. The size of the CTU may alternatively be 128×128, 256×256, or the like.

CU: A coding unit is a leaf node obtained through CTU splitting, that is, a node that is not further split in a coding tree. One CU corresponds to one rectangular picture block, and a size of a width and a size of a height of the CU each may be represented through a quantity of pixels. For example, the size of the width of the CU may be 256, 128, 64, 32, 8, or 4 pixels, and the size of the height of the CU may be 256, 128, 64, 32, 8, or 4 pixels. The height of the CU may be equal to or unequal to the width of the CU. For example, the height of the CU is equal to the width of the CU when a quadtree split is used, while the height of the CU is not necessarily equal to the width of the CU when a binary tree split and/or a ternary tree split is used.

In a video encoding process, a video frame (which may also be referred to as a picture) of video data is used as an example. A video encoding device encodes, by CU according to an encoding rule, all CUs included in one CTU, and further encodes a plurality of CTUs of the picture, to obtain a bitstream. In a video data decoding process, a video decoding device reconstructs (including performing prediction, dequantization, inverse transformation, filtering, and other decoding processing), according to a decoding rule corresponding to the encoding rule in the encoding process, a plurality of CUs included in one CTU, and further reconstructs a plurality of CTUs of the picture, to obtain the reconstructed picture.

In the embodiments of the present disclosure, both a CTU and a CU are nodes in a coding tree. The CTU is a root node, and a specific quantity of nodes are obtained by splitting the CTU. Some or all nodes in nodes obtained by splitting the CTU once may be further split into nodes of smaller sizes, and splitting continues to be performed until all nodes do not need to be further split. Finally, a node that does not need to be further split is referred to as a leaf node. In other words, the leaf node is a node that does not need to be further split at the end of the coding tree. Generally, one leaf node corresponds to one CU.

Figure 1B:
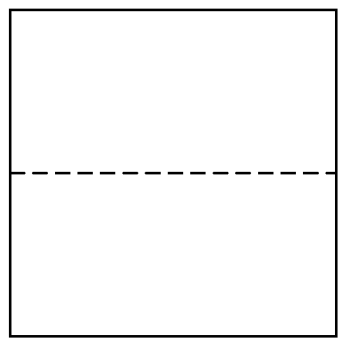
Figure 1C:
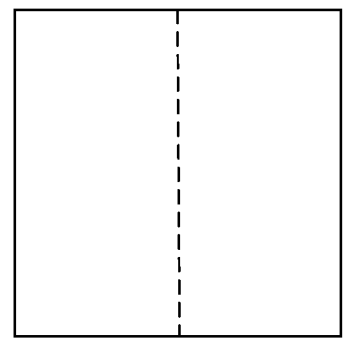
Figure 1D:
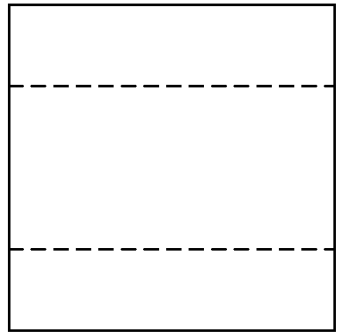
Figure 1E:
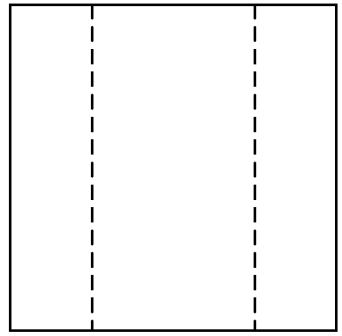

In the field of video data encoding and decoding, there may be methods for splitting a node into child nodes such as a quadtree split method, a binary tree split method, a ternary tree split method, and the like. A quadtree split means that a node is split into four child nodes of equal sizes. For example, FIG. 1(a) is a schematic diagram of quadtree split. A binary tree split means that a node is split into two child nodes of equal sizes. Specifically, horizontal binary splitting or vertical binary splitting may be used. For example, FIG. 1(b) is a schematic diagram of horizontal binary splitting, and FIG. 1(c) is a schematic diagram of vertical binary splitting. A ternary tree split means that one node is split into three child nodes. Specifically, horizontal ternary splitting or vertical ternary splitting may be used. In horizontal ternary splitting, proportions of heights of upper, middle, and lower regions to a height of a current split node are respectively ¼, ½, and ¼. Correspondingly, in vertical ternary splitting, proportions of widths of left, middle, and right regions to a width of the current split node is ¼, ½, ¼. For example, FIG. 1(d) is a schematic diagram of horizontal ternary splitting, and FIG. 1(e) is a schematic diagram of vertical ternary splitting.

In a CTU splitting process, any one or more of the quadtree split, the ternary tree split, and the binary tree split may be selected. For example, in an implementation, a split method in which the quadtree split method is first used and the binary tree split method is then used. To be specific, the CTU is first split by using the quadtree split method to obtain four nodes; and if one or more of the obtained four nodes need to be further split, the one or more nodes that need to be further split is/are split into smaller nodes by using the binary tree split method.

It should be noted that the CTU further includes some syntax elements, for example, split mode information indicating a split mode to be used for node splitting. The syntax elements further include a flag indicating whether each node continues to be split. Each node corresponds to a flag indicating whether a node is to be further split. In the following embodiments, a flag indicating whether a node is to be further split is referred to as a split flag. If a size of a node is a minimum allowed size of the node, the node cannot be further split. In this case, the flag indicating whether the node is to be further split does not need to be included in a syntax element, and a decoder side may directly determine, based on the size of the node, that the node does not need to be further split.

Split flag: A split flag is used to indicate whether a node corresponding to the split flag needs to be further split into nodes of smaller sizes. In a video data encoding process, a video encoding device encodes a picture block corresponding to a node to obtain a bitstream, and the video encoding device also encodes the split flag of the node, and writes an encoded split flag into the bitstream. In this way, when a video decoding device decodes video data, the video decoding device parses the bitstream to obtain the split flag of the node, to reconstruct the picture corresponding to the node.

In the embodiments of the present disclosure, "0" may be used to indicate that a node continues to be split, or "1" may be used to indicate that a node continues to be split. Specifically, an appropriate identifier may be selected depending on an actual situation to indicate that a node continues to be split. This is not limited in the embodiments of the present disclosure.

Likewise, "0" may be used to indicate that a node does not need to be further split, or "1" may be used to indicate that a node does not need to be further split. Specifically, an appropriate identifier may be selected depending on an actual situation to indicate that a node does not need to be further split. This is not limited in the embodiments of the present disclosure.

It should be noted that in the embodiments of the present disclosure, if "1" is used to indicate that a node continues to be split, "0" may be used to indicate that the node does not need to be further split.

In view of the problem described in the background part, embodiments of the present disclosure provide a context modeling method and apparatus of a split flag. A device (a video encoding device or a video decoding device) may determine a context model of a split flag of a current node based on a width and a height of a current node, a height of a first leaf node adjacent to the current node, and a width of a second leaf node adjacent to the current node, to more accurately determine the context model of the split flag, and improve entropy coding efficiency of the split flag.

The context modeling method and apparatus of the split flag provided in the embodiments of the present disclosure may be applied to a video data encoding scenario or a video data decoding scenario. Specifically, the context modeling method and apparatus of the split flag may be applied to a scenario of encoding a split flag in a video data encoding process, or applied to a scenario of decoding a split flag in a video data decoding process. The method may be applied to a device having an encoding and/or decoding function. In the embodiments of the present disclosure, a device configured to encode video data is referred to as a video encoding device, and a device configured to decode video data is referred to as a video decoding device. After the video encoding device obtains video data, the video encoding device encodes the video data, may compress the video data into a bitstream (that is, encoded video data), and then sends the encoded video data to another device (for example, the video decoding device). After the video decoding device obtains the encoded video data, the video decoding device may decode the encoded video data to restore complete information of the video data.

Figure 2:
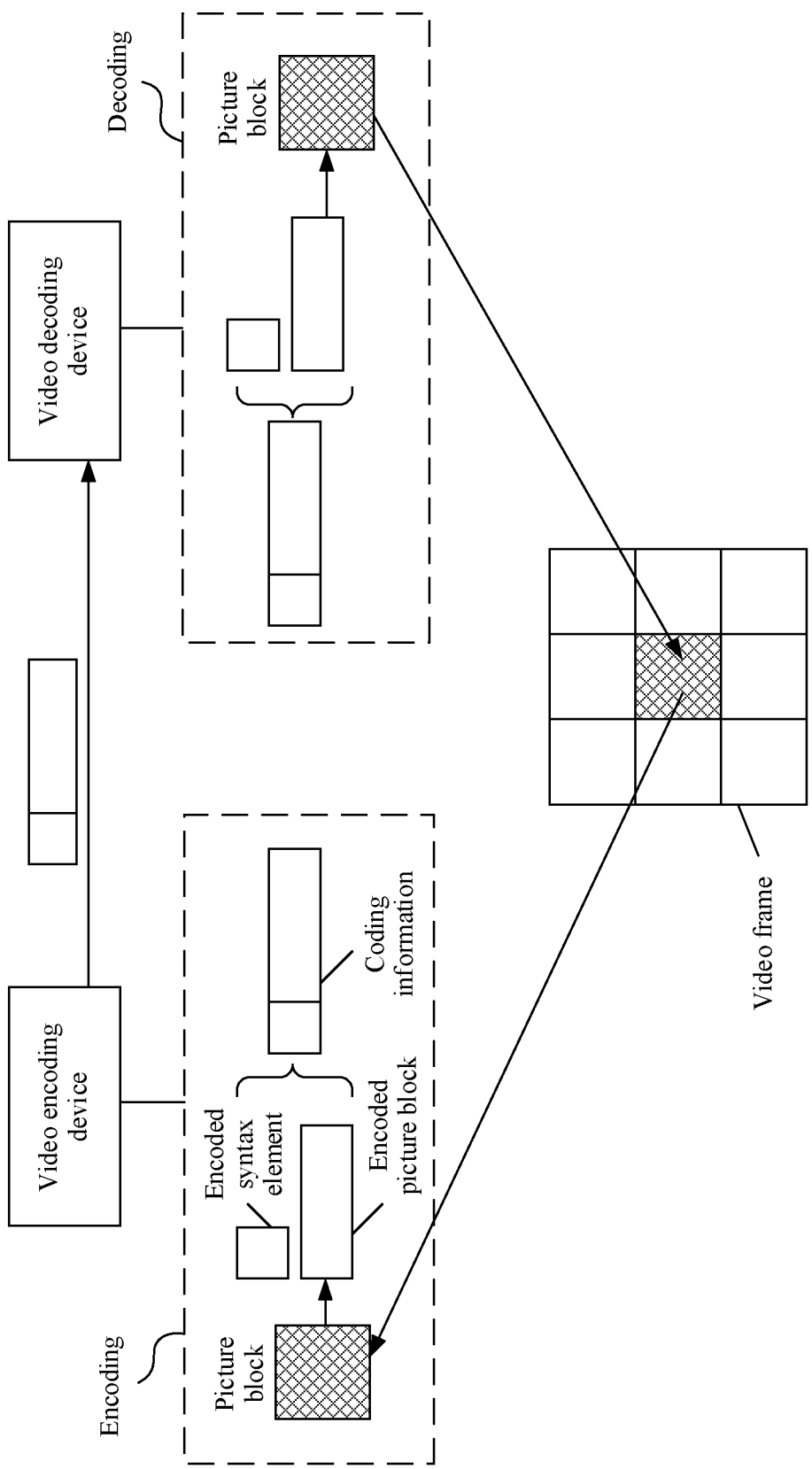
FIG. 2 is a schematic diagram of a video data encoding and video data decoding method according to an embodiment of the present disclosure.

The following uses a picture block in a video frame of video data as an example to describe a brief process of video data encoding and video data decoding. As shown in FIG. 2, a video encoding device may encode (perform prediction, transformation, quantization, entropy coding, and other processing on) the picture block to obtain an encoded picture block, and the video encoding device performs corresponding encoding on a syntax element (for example, a split flag) of the picture block. An encoded syntax element and an encoded picture block form coding information (that is, a bitstream). The coding information of the video data includes encoded picture data and the encoded syntax element. After a video decoding device receives the coding information, the video decoding device decodes (performs prediction, dequantization, inverse transformation, and other processing on) the encoded syntax element in the coding information, and then the video decoding device reconstructs the picture block based on the syntax element extracted from the coding information. In other words, the video decoding device obtains a predicted pixel block of the picture block based on the syntax element associated with the picture block and the encoded picture block.

The context modeling method of the split flag provided in the embodiments of the present disclosure may be applied to a video encoding device or a video decoding device. Both the video encoding device and the video decoding device may be desktop computers, mobile computing apparatuses, notebook computers (for example, laptop computers), tablet computers, set-top boxes, or handheld devices such as intelligent telephones, televisions, cameras, display apparatuses, digital media players, video game consoles, vehicle-mounted computers, virtual reality devices, augmented reality devices, or other similar devices.

Figure 3:
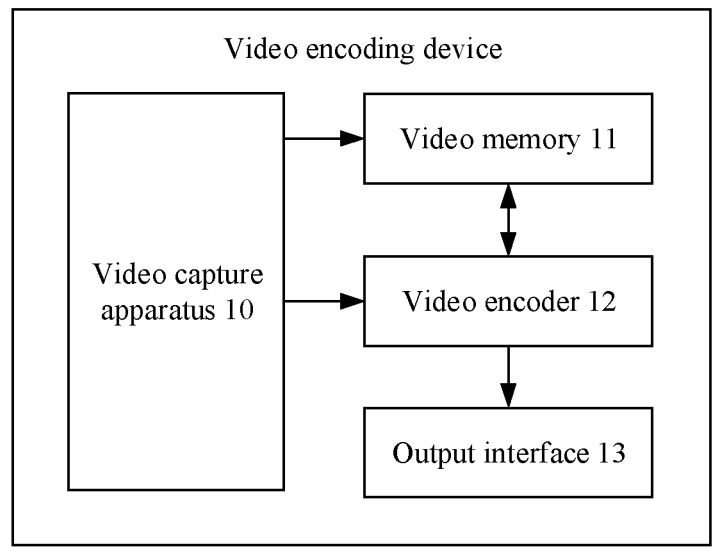
FIG. 3 is a schematic hardware diagram of a video encoding device according to an embodiment of the present disclosure.

The following describes various components of a video encoding device in the embodiments of the present disclosure in detail with reference to FIG. 3. As shown in FIG. 3, the video encoding device provided in the embodiments of the present disclosure includes components such as a video capture apparatus 10, a video memory 11, a video encoder 12, and an output interface 13. A person skilled in the art may understand that the structure of the video encoding device shown in FIG. 3 does not constitute any limitation on the video encoding device, and the video encoding device may include more or fewer components than those shown in FIG. 3, or may include a combination of some of the components shown in FIG. 3, or may include components arranged differently from those shown in FIG. 3.

The video capture apparatus 10 is an apparatus for obtaining video data, and the video capture apparatus may be a video camera.

The video memory 11 may store video data obtained by the video capture apparatus, or may store a bitstream obtained after the video encoder 12 encodes the video data.

The video encoder 12 may encode, according to a coding standard (for example, H.264), the video data obtained by the video capture apparatus, and convert encoded video data into code that can be identified by a machine, to compress the video data, thereby facilitating transmission and storage of the video data. The video encoder 12 may be a central processing unit (central processing unit, CPU), a general-purpose processor, a digital signal processor (digital signal processor, DSP), or an disclosure-specific integrated circuit (disclosure-specific integrated circuit, ASIC), a field programmable gate array (field programmable gate array, FPGA) or another programmable logic device, a transistor logic device, a hardware component, or any combination thereof. The foregoing enumerated examples of the video encoder 12 may implement or execute various example logical blocks, modules, and circuits described in content disclosed in the embodiments of the present disclosure. Alternatively, the video encoder 12 may be a combination for implementing a computation function, for example, a combination including one or more microprocessors, or a combination of a DSP and a microprocessor.

The output interface 13 is an interface circuit configured to send data to another device. The output interface 13 may have a structure with a transceiver function. For example, the output interface 13 may be a transceiver or a transceiver circuit, and includes a modulator/demodulator (modem) and/or a transmitter. In a video coding system, the output interface 13 may send the encoded video data to a video decoding device.

Optionally, the video encoding device shown in FIG. 3 may further include a wireless fidelity (wireless fidelity, Wi-Fi) module, a Bluetooth module, and the like. Details are not described herein.

Figure 4:
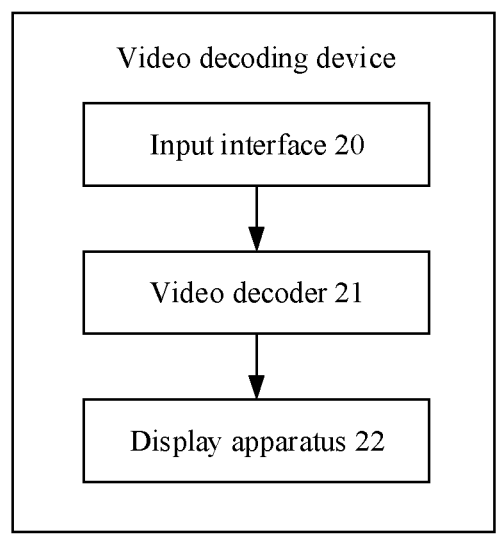
FIG. 4 is a schematic hardware diagram of a video decoding device according to an embodiment of the present disclosure.

The following describes various components of a video decoding device in the embodiments of the present disclosure in detail with reference to FIG. 4. As shown in FIG. 4, the video decoding device provided in the embodiments of the present disclosure includes components such as an input interface 20, a video decoder 21, and a display apparatus 22. A person skilled in the art may understand that the structure of the video decoding device shown in FIG. 4 does not constitute any limitation on the video decoding device, and the video decoding device may include more or fewer components than those shown in FIG. 4, or may include a combination of some of the components shown in FIG. 4, or may include components arranged differently from those shown in FIG. 4.

The input interface 20 is configured to receive data sent by another device (for example, a video encoding device), and the input interface 20 may be a receiver and/or a modem. In a video coding system, the input interface 20 may receive encoded video data sent by an video encoding device.

The video decoder 21 may restore and decode, that is, decompress, the encoded video data received by the video decoder 21, so that the decoded video data can be played on the display apparatus. The video decoder 21 may be a CPU, a general-purpose processor, a DSP, or an ASIC, an FPGA or another programmable logic device, a transistor logic device, a hardware component, or any combination thereof. The foregoing enumerated examples of the video decoder 21 may implement or execute various example logical blocks, modules, and circuits described in content disclosed in the embodiments of the present disclosure. Alternatively, the video decoder 21 may be a combination for implementing a computation function, for example, a combination including one or more microprocessors, or a combination of a DSP and a microprocessor.

The display apparatus 22 is configured to display decoded video data. The display apparatus may include a plurality of display apparatuses, for example, a liquid crystal display (liquid crystal display, LCD), a plasma display, an organic light-emitting diode (organic light-emitting diode, OLED) display, or another type of display apparatus. Optionally, the display apparatus 22 may be integrated into the video decoding device, or the display apparatus 22 may be independent of the video decoding device and is disposed outside the video decoding device.

In a process of encoding or decoding video data, a split flag is a very important syntax element, and context modeling of the split flag is also important. The following separately describes, from perspectives of encoding a split flag in a video data encoding scenario and decoding a split flag in a video data decoding scenario, a context modeling method of a split flag provided in the embodiments of the present disclosure. A split flag of a current node is used to indicate whether the current node needs to be split.

Figure 5:
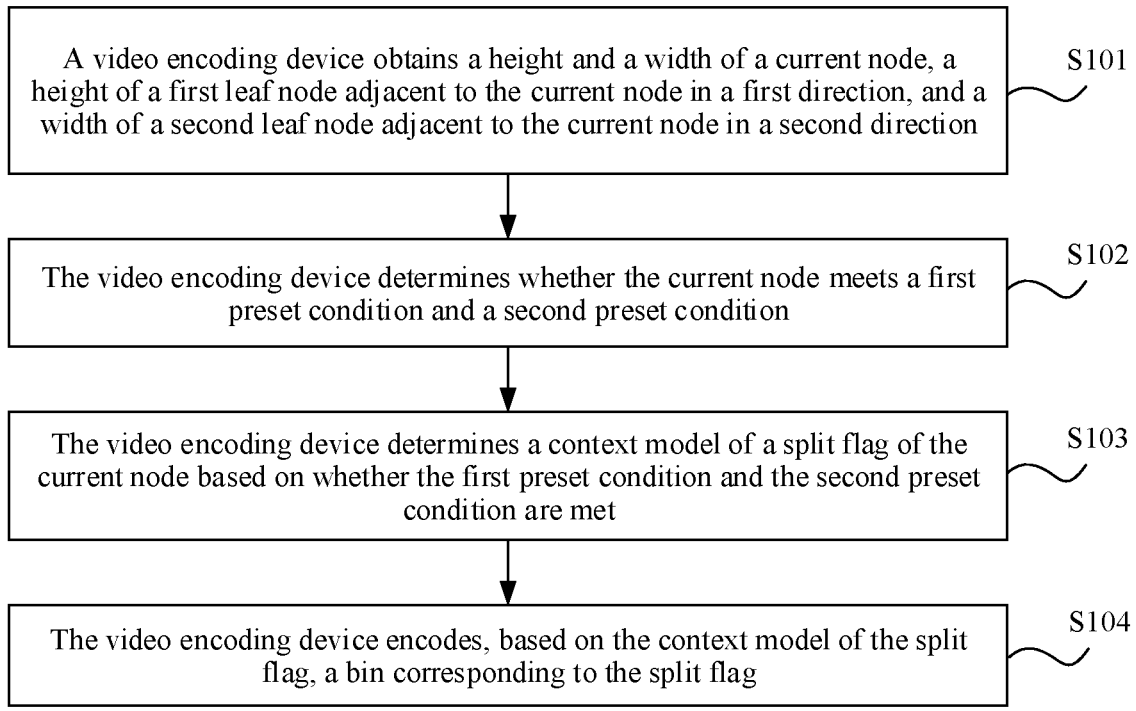
FIG. 5 is a first schematic diagram of a context modeling method of a split flag according to an embodiment of the present disclosure.

First, as shown in FIG. 5, in a process of encoding a split flag, a context modeling method of the split flag provided in an embodiment of the present disclosure may include S101 to S104.

S101: A video encoding device obtains a height and a width of a current node, a height of a first leaf node adjacent to the current node in a first direction, and a width of a second leaf node adjacent to the current node in a second direction.

The first direction is perpendicular to the second direction, and the first leaf node and the second leaf node are reconstructed leaf nodes, that is, the first leaf node and the second leaf node have been encoded. For example, if the first direction may be a leftward horizontal direction or a rightward horizontal direction, the second direction may be an upward vertical direction or a downward vertical direction.

The height of the current node and the height of the first leaf node each are a measurement of neighboring sides that are of the current node and the first leaf node and that are in a same direction. The width of the current node and the width of the second leaf node are a measurement of neighboring sides that are of the current node and the second leaf node and that are in a same direction.

Figure 6:
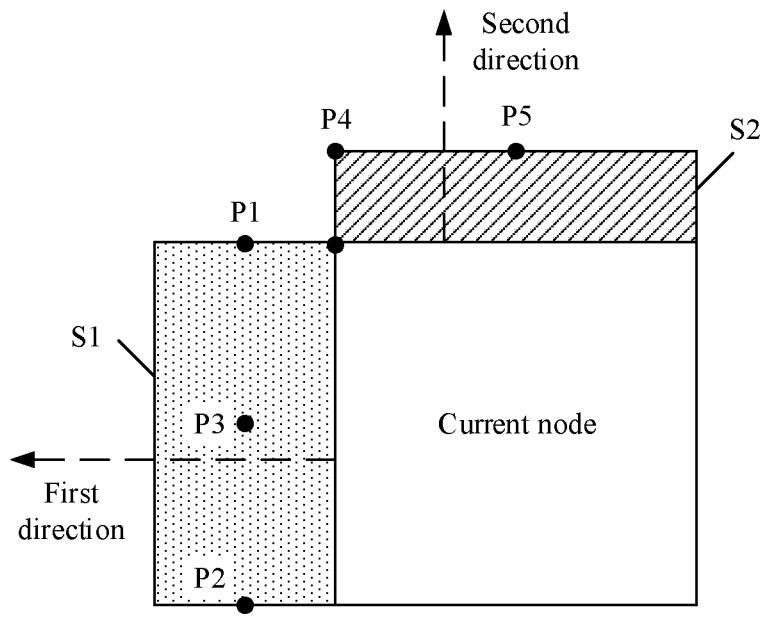
FIG. 6 is a schematic structural diagram of a node position according to an embodiment of the present disclosure.

Optionally, the first direction may be the leftward horizontal direction, and the second direction may be the upward vertical direction. As shown in FIG. 6, it can be learned that the first direction is a direction horizontally pointing to an left side of the current node, and the second node is a direction vertically pointing to the upper side of the current node. If the first direction is the leftward horizontal direction, the first leaf node is an adjacent leaf node on the left side of the current node, and the first leaf node may also be referred to as a left-side leaf node. If the second direction is the upward vertical direction, the second leaf node is an adjacent leaf node on the upper side of the current node, and the second leaf node may also be referred to as an upper-side leaf node.

The first leaf node covers a preset position in the first direction of the current node, and the second leaf node covers a preset position in the second direction of the current node. With reference to FIG. 6, the foregoing method for determining the first leaf node may be as follows: Any leaf node, in at least one leaf node on the left side of the current node, that covers a preset position on the left side of the current node is determined as the first leaf node. The preset position may be any position, away from the current node for a preset distance, in a region S1 on the left side of the current node. The distance may be less than or equal to a width of one CU. For example, the preset distance may be 4, 8, or another value. For example, if the width of the current node is M, the height is N, and the preset distance is 1, coordinates corresponding to an upper-left pixel of the current node are (x, y), and the preset position may be a position P1 whose coordinates are (x−1, y), a position P2 whose coordinates are (x−1, y+N−1), or a position P3 whose coordinates are (x−1, y+N/2) in S1. The preset position may be another position in S1. The preset position is specifically selected depending on an actual situation, and this is not limited in this embodiment of the present disclosure.

Similarly, with reference to FIG. 6, the foregoing method for determining the second leaf node may be as follows: A leaf node that covers a preset position on the upper side of the current node is determined as the second leaf node. The preset position may be any position, away from the current node for a preset distance, in a region S2 on the upper side of the current node. For example, if the width of the current node is M, the height is N, and the preset distance is 1, coordinates corresponding to an upper-left pixel of the current node are (x, y), the preset position may be a position P4 whose coordinates are (x, y−1), a position P5 whose coordinates are (x+M/2, y−1) in S2. The preset position may be another position in S2. The preset position is specifically selected depending on an actual situation, and this is not limited in this embodiment of the present disclosure.

It should be noted that in this embodiment of the present disclosure, the first direction may alternatively be the rightward horizontal direction, and in this case the first leaf node is a right-side leaf node; the second direction may alternatively be the downward vertical direction, and in this case the second leaf node is a down-side leaf node. Specifically, the first direction and the second direction may be determined according to an actual encoding rule, to determine the first leaf node and the second leaf node. This is not limited in this embodiment of the present disclosure.

S102: The video encoding device determines whether the current node meets a first preset condition and a second preset condition.

The first preset condition is that the height of the current node is greater than the height of the first leaf node, and the second preset condition is that the width of the current node is greater than the width of the second leaf node.

In this embodiment of the present disclosure, whether the current node is to be further split may be estimated by comparing a length of a side of the current node with a length of a neighboring side of a leaf node adjacent to the current node. If the height of the current node is greater than the height of the first leaf node, it indicates that a probability that the current node continues to be horizontally split is comparatively high. If the height of the current node is less than or equal to the height of the first leaf node, it indicates that a probability that the current node continues to be horizontally split is comparatively low. If the width of the current node is greater than the width of the second leaf node, it indicates that a probability that the current node continues to be vertically split is comparatively high. If the width of the current node is less than or equal to the width of the second leaf node, it indicates that a probability that the current node continues to be vertically split is comparatively low.

It should be noted that in this embodiment of the present disclosure, in S102, the terminal device may determine, in one determining action, whether the current node meets the first preset condition and the second preset condition. Alternatively, the terminal device may respectively determine, in two determining actions, whether the current node meets the first preset condition and the second preset condition. Optionally, the terminal device may first determine whether the current node meets the first preset condition, and then determine whether the current node meets the second preset condition. Alternatively, the terminal device may first determine whether the current node meets the second preset condition, and then determine whether the current node meets the first preset condition. This is not specifically limited in the embodiments of the present disclosure.

S103: The video encoding device determines a context model of a split flag of the current node based on whether the first preset condition and the second preset condition are met.

In this embodiment of the present disclosure, the video encoding device may determine the context model of the split flag of the current node based on whether the current node meets the first preset condition and the second preset condition. The context model of the split flag is a probability model of a bin corresponding to the split flag. An existing video coding standard (for example, H.265) specifies a context model of a split flag. There are N context models of a split flag, indexes of the N context models may be sequentially 0 to N−1, and N is an integer greater than 1.

The method for determining the context model of the split flag of the current node by the video encoding device based on whether the first preset condition and the second preset condition are met includes: The video encoding device determines a index of the context model of the split flag of the current node based on whether the first preset condition and the second preset condition are met. Specifically, in an implementation, the index of the context model of the split flag of the current node meets:

$$ctxInc = n\_conL + n\_conA.$$

ctxInc represents the index of the context model of the split flag; n_conL represents whether the first preset condition is met, where when n_conL is 1, it indicates that the first preset condition is met, and when n_conL is 0, it indicates that the first preset condition is not met; and n_conA represents whether the second preset condition is met, where when n_conA is 1, it indicates that the second preset condition is met, and when n_conA is 0, it indicates that the second preset condition is not met.

For example, when the first preset condition is not met and the second preset condition is not met, the index of the context model of the split flag of the current node is 0; when the first preset condition is met but the second preset condition is not met, the index of the context model of the split flag of the current node is 1, or when the first preset condition is not met but the second preset condition is met, the index of the context model of the split flag of the current node is 1; and when the first preset condition is met and the second preset condition is also met, the index of the context model of the split flag of the current node is 2. Specifically, a type of the context model of the split flag is not limited in this embodiment of the present disclosure.

S104: The video encoding device encodes, based on the context model of the split flag, the bin corresponding to the split flag.

In this embodiment of the present disclosure, the split flag may be binarized as a binary bin. It is assumed that the split flag may be 0 or 1 (one value indicates that the current node continues to be split, and the other value indicates that the current node does not need to be further split). In this case, the split flag may be binarized as one binary bin. A bin being 0 corresponds to the split flag 0, and a bin 1 corresponds to the split flag 1. Encoding the split flag may be understood as encoding a bin corresponding to the split flag. Specifically, a value of the bin is encoded based on a probability value of the bin corresponding to the split flag in a probability model.

In this embodiment of the present disclosure, the video encoding device completes encoding the bin corresponding to the split flag, that is, it is considered that the video encoding device completes encoding the split flag, so that the video encoding device writes information about an encoded split flag, split mode information, coding unit information, and other information into a bitstream, to complete encoding video data.

It should be noted that in this embodiment of the present disclosure, from a perspective of information theory, if a probability that a bin is 1 is closer to 0.5, an average larger quantity of bits are required for encoding the bin; and if a probability that a bin is 1 is closer to 0 or 1, an average smaller quantity of bits are required for encoding the bin. In this embodiment of the present disclosure, the context model, of the current node, that is determined based on context information of the current node (that is, the first leaf node and the second leaf node that are adjacent to the current node) is comparatively accurate, that is, the probability model of the bin corresponding to the split flag of the current node is comparatively accurate. In the probability model, a probability value of the bin being 1 corresponding to the split flag is closer to 0 or 1. Therefore, a comparatively small quantity of bits are required for encoding the split flag, and efficiency of entropy coding of split flag can be improved.

Optionally, in this embodiment of the present disclosure, the video encoding device may further update, based on the value of the bin corresponding to the split flag, the probability value of the bin corresponding to the split flag, and the probability value is dynamically updated with picture content.

When the context modeling method of the split flag provided in this embodiment of this disclosure is used for determining the context model of the split flag in the scenario of encoding the split flag, the video encoding device can more accurately determine, by comparing the height of the current node with the height of the first leaf node and comparing the width of the current node with the width of the second leaf node, whether the current node is to be further split. This can more accurately determine the context model of the split flag based on whether the foregoing two preset conditions are met, and improve efficiency of entropy coding of the split flag.

Further, when a binary tree split and/or a ternary tree split is used for splitting any node, the height of the current node may be compared with the height of the first leaf node and the width of the current node may be compared with the width of the second leaf node in this embodiment of the present disclosure, so that the context model of the split flag of the current node is determined more accurately. In this way, a prior-art problem that a context model, determined based on depth information, of the split flag of the current node is inaccurate can be well resolved. For example, when a depth of the current node is the same as a depth of the first leaf node, but the height of the current node is far greater than the height of the first leaf node, it is more likely to determine that the current node does not need to be further split in the prior art. Actually, because the height of the current node is comparatively large, there is a comparatively high probability that the current node should be further horizontally split.

Figure 7:
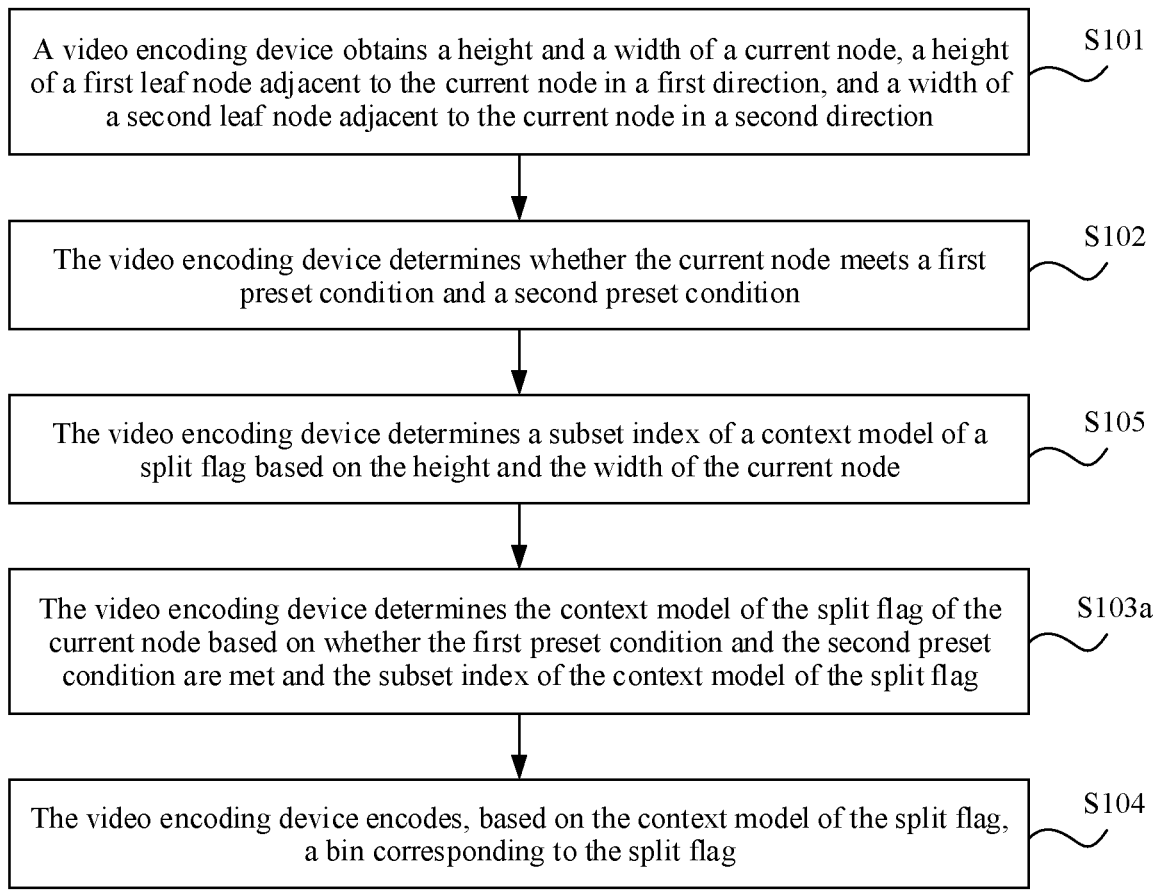
FIG. 7 is a second schematic diagram of a context modeling method of a split flag according to an embodiment of the present disclosure.

Optionally, with reference to FIG. 5, as shown in FIG. 7, in the context modeling method of the split flag provided in this embodiment of the present disclosure, before S103, S105 is further included.

S105: The video encoding device determines a subset index of the context model of the split flag based on the height and the width of the current node.

In this embodiment of the present disclosure, for nodes of different sizes, probabilities of whether the nodes are to be further split may be different. For example, there is a comparatively high probability that a larger-size node is to be further split to some extent, and there is a comparatively low probability that a smaller-size node is to be further split. Based on this perspective, the current node may be classified into a subset based on a size of the current node, and the context model of the split flag of the current node may accordingly correspond to a subset model. Specifically, the subset index of the context model of the split flag of the current node may be determined based on the height and the width of the current node.

In an optional implementation, S105 may be specifically implemented through S105a.

S105a: The video encoding device obtains an area of the current node based on the height and the width of the current node, and then determines the subset index of the context model of the split flag based on a preset mapping relationship between a node area and a subset index.

In this embodiment of the present disclosure, the video encoding device first determines the area of the current node based on a product of the height and the width of the current node, and then determines, based on the area of the current node and the preset mapping relationship between the node area and the subset index, the subset index corresponding to the area of the current node, that is, a index of the subset of the context model of the split flag.

Figure 8:
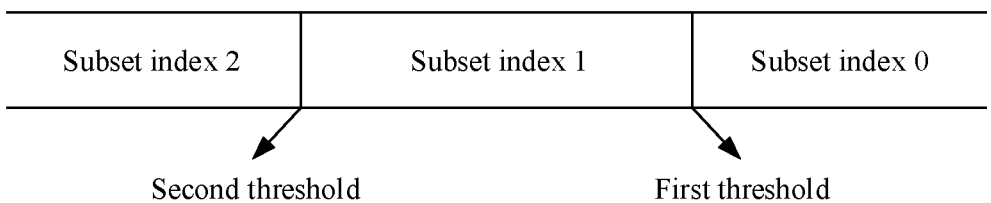
FIG. 8 is a schematic diagram of a mapping relationship between a node area and a subset index according to an embodiment of the present disclosure.

Optionally, as shown in FIG. 8, in this embodiment of the present disclosure, if subset indexes are 0, 1, and 2, the preset mapping relationship between the node area and the subset index may be as follows: When the node area is greater than a first threshold, a corresponding subset index is 0; when the node area is less than a second threshold, a corresponding subset index is 2; and when the node area is greater than or equal to the second threshold and less than or equal to the first threshold, a corresponding subset index is 1. For example, if the first threshold is 2048, the width of the current node is 64, the height of the current node is 64, and the area of the current node is 4096, the subset index of the split flag of the current node is 0. The first threshold is greater than the second threshold.

It should be noted that in this embodiment of the present disclosure, the first threshold may be 1024, 2048, or 4096, and the second threshold may be 256 or 512. Specifically, the first threshold and the second threshold may be determined depending on an actual situation, and this is not limited in this embodiment of the present disclosure.

In another optional implementation, S105 may be specifically implemented through S105b.

S105b: The video encoding device queries a preset subset index query table for the subset index of the context model of the split flag based on the height and the width of the current node.

In this embodiment of the present disclosure, the subset index of the context model of the split flag may be determined based on the height and the width of the current node and the preset mapping relationship between a subset index and a height and a width of a node. The preset mapping relationship between the subset index and the height and the width of the node may be the preset subset index query table. The preset subset index query table includes the height and the width of the current node, and the subset index corresponding to the width and the height of the current node.

For example, the preset subset index query table may include the following Table 1, Table 2, and Table 3. In an actual using process, one of the three subset index query tables may be selected depending on an actual situation to query the subset index of the context model of the split flag. The following shows examples of Table 1, Table 2, and Table 3.

TABLE 1

| Name | | Width of the current node | | | | | |
|---|---|---|---|---|---|---|---|
| | | 4 | 8 | 16 | 32 | 64 | 128 |
| Height of the current node | 4 | | 4 | 4 | | | |
| | 8 | 4 | 4 | 3 | 3 | | |
| | 16 | 4 | 3 | 3 | 2 | 2 | |
| | 32 | | 3 | 2 | 2 | 1 | 1 |
| | 64 | | | 2 | 1 | 1 | 0 |
| | 128 | | | 1 | 1 | 0 | 0 |

TABLE 2

| Name | | Width of the current node | | | | | |
|---|---|---|---|---|---|---|---|
| | | 4 | 8 | 16 | 32 | 64 | 128 |
| Height of the current node | 4 | | 2 | 2 | | | |
| | 8 | 2 | 2 | 2 | 1 | | |
| | 16 | 2 | 2 | 2 | 1 | 0 | |
| | 32 | | 1 | 1 | 1 | 0 | 0 |
| | 64 | | | 0 | 0 | 0 | 0 |
| | 128 | | | 0 | 0 | 0 | 0 |

TABLE 3

| Name | | Width of the current node | | | | | |
|---|---|---|---|---|---|---|---|
| | | 4 | 8 | 16 | 32 | 64 | 128 |
| Height of the | 4 | | 1 | 1 | 1 | 1 | |
| | 8 | 1 | 1 | 1 | 1 | 0 | 0 |

TABLE 3-continued

| Name | | Width of the current node | | | | | |
|---|---|---|---|---|---|---|---|
| | | 4 | 8 | 16 | 32 | 64 | 128 |
| current node | 16 | 1 | 1 | 1 | 0 | 0 | 0 |
| | 32 | 1 | 1 | 0 | 0 | 0 | 0 |
| | 64 | 1 | 0 | 0 | 0 | 0 | 0 |
| | 128 | | 0 | 0 | 0 | 0 | 0 |

It should be noted that in Table 1, Table 2, and Table 3, a blank position indicates that a node corresponding to a combination of a width and a height does not need to be further split or definitely does not exist. As shown in Table 1, a node whose height is 4 and whose width is 4 does not need to be further split.

For example, if the subset index query table shown in Table 1 is used, if the width and the height of the current node are respectively 16 and 64, it is found through querying Table 1 that the subset index of the context model of the split flag of the current node is 2.

It should be noted that in this embodiment of the present disclosure, the foregoing preset subset index query table is merely an optional implementation of the preset mapping relationship between the subset index and the height and the width of the node. The preset mapping relationship between the subset index and the height and the width of the node may be a mapping relationship in another form. This is not specifically limited in this embodiment of the present disclosure.

Optionally, as shown in FIG. 7, S103 may be specifically implemented through S103a.

S103a: The video encoding device determines the context model of the split flag of the current node based on whether the first preset condition and the second preset condition are met and the subset index of the context model of the split flag.

In this embodiment of the present disclosure, the foregoing method for determining the context model of the split flag of the current node based on whether the first preset condition and the second preset condition are met and the subset index of the context model of the split flag may include: determining the index of the context model of the split flag based on whether the first preset condition and the second preset condition are met and the subset index of the context model of the split flag of the current node. In an implementation, the index of the context model of the split flag meets:

$$ctxInc = n\_conL + n\_conA + X*A.$$

ctxInc represents the index of the context model of the split flag; n_conL represents whether the first preset condition is met, where when n_conL is 1, it indicates that the first preset condition is met, and when n_conL is 0, it indicates that the first preset condition is not met; n_conA represents whether the second preset condition is met, where when n_conA is 1, it indicates that the second preset condition is met, and when n_conA is 0, it indicates that the second preset condition is not met; X represents the subset index of the context model of the split flag; A represents a quantity of context models of the split flag that correspond to the subset index; and * represents multiplication.

According to the context modeling method of the split flag provided in this embodiment of the present disclosure, the subset index of the split flag of the current node may be determined based on the size of the current node, and the context model, of the split flag, determined based on both whether the first preset condition and the second preset condition are met and the subset index of the context model of the split flag is comparatively accurate. This can further improve efficiency of entropy coding of the split flag.

Figure 9:
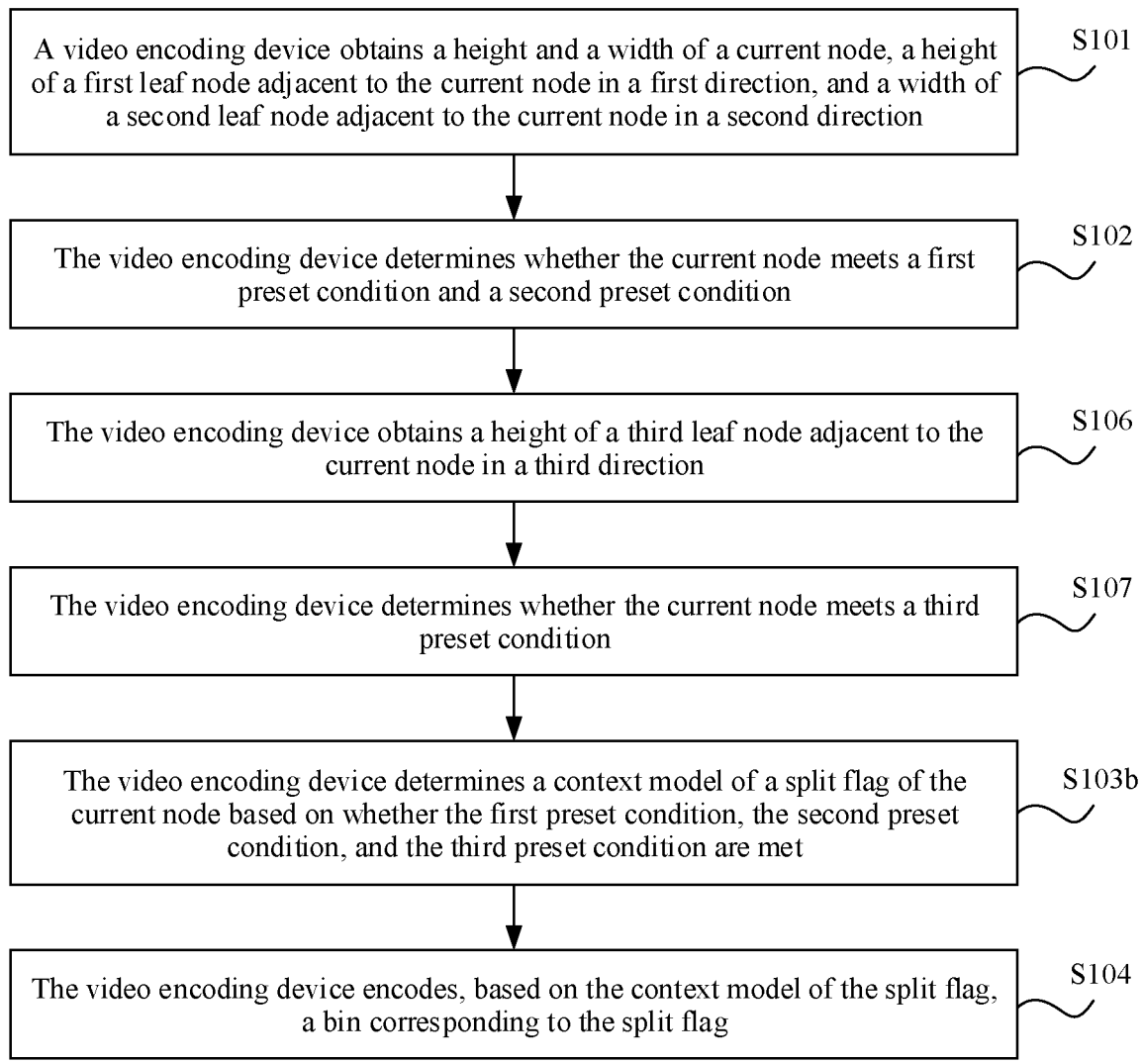
FIG. 9 is a third schematic diagram of a context modeling method of a split flag according to an embodiment of the present disclosure.

Optionally, with reference to FIG. 5, as shown in FIG. 9, in the context modeling method of the split flag provided in this embodiment of the present disclosure, before S103, S106 and S107 are further included.

S106: The video encoding device obtains a height of a third leaf node adjacent to the current node in a third direction.

The third direction is opposite to the first direction, and the third leaf node is a reconstructed leaf node.

In this embodiment of the present disclosure, if the first direction is a leftward horizontal direction, the third direction is a rightward horizontal direction. The third leaf node is a leaf node on the right side of the current node and is adjacent to the current node, and therefore the third leaf node may also be referred to as a right-side leaf node.

S107: The video encoding device determines whether the current node meets a third preset condition.

The third preset condition is that the height of the current node is greater than the height of the third leaf node.

In this embodiment of the present disclosure, if the height of the current node is greater than the height of the third leaf node, it indicates that a probability that the current node continues to be horizontally split is comparatively high. If the height of the current node is less than or equal to the height of the third leaf node, it indicates that a probability that the current node continues to be horizontally split is comparatively low.

Optionally, as shown in FIG. 9, S103 may be specifically implemented through S103b.

S103b: The video encoding device determines the context model of the split flag of the current node based on whether the first preset condition, the second preset condition, and the third preset condition are met.

In this embodiment of the present disclosure, the method for determining the context model of the split flag of the current node based on whether the first preset condition, the second preset condition, and the third preset condition may include: determining a index of the context model of the split flag of the current node based on whether the first preset condition, the second preset condition, and the third preset condition are met. In an implementation, the index of the context model of the split flag meets:

$$ctxInc=\min(n\_conL+n\_conA+n\_conR,N-1).$$

ctxInc represents the index of the context model of the split flag; n_conL represents whether the first preset condition is met, where when n_conL is 1, it indicates that the first preset condition is met, and when n_conL is 0, it indicates that the first preset condition is not met; n_conA represents whether the second preset condition is met, where when n_conA is 1, it indicates that the second preset condition is met, and when n_conA is 0, it indicates that the second preset condition is not met; n_conR represents whether the third preset condition is met, where when n_conR is 1, it indicates that the third preset condition is met, and when n_conR is 0, it indicates that the third preset condition is not met; and min(a, b) represents taking a smaller value between a and b.

According to the context modeling method of the split flag provided in this embodiment of the present disclosure, whether the current node meets the third preset condition may be determined based on another leaf node adjacent to the current node, and the context model, of the split flag, determined based on both whether the first preset condition and the second preset condition are met and whether the third preset condition is met is comparatively accurate. This can further improve efficiency of entropy coding of the split flag.

Optionally, in this embodiment of the present disclosure, the video encoding device may further obtain a width of a fourth leaf node adjacent to the current node in a fourth direction, where the fourth direction is opposite to the second direction, and the fourth leaf node is a reconstructed leaf node. Then, the video encoding device determines whether the current node meets a fourth preset condition, where the fourth preset condition is that the width of the current node is greater than the width of the fourth leaf node. Therefore, the method for determining a context model of a split flag of the current node based on whether the first preset condition and the second preset condition are met may include: The video encoding device determines the context model of the split flag of the current node based on whether the first preset condition, the second preset condition, and the fourth preset condition are met.

Specifically, the video encoding device determines the index of the context model of the split flag of the current node based on whether the first preset condition, the second preset condition, and the fourth preset condition are met. This is similar to S103b. For details, refer to the related description of S103b. Details are not described herein again.

Figure 10:
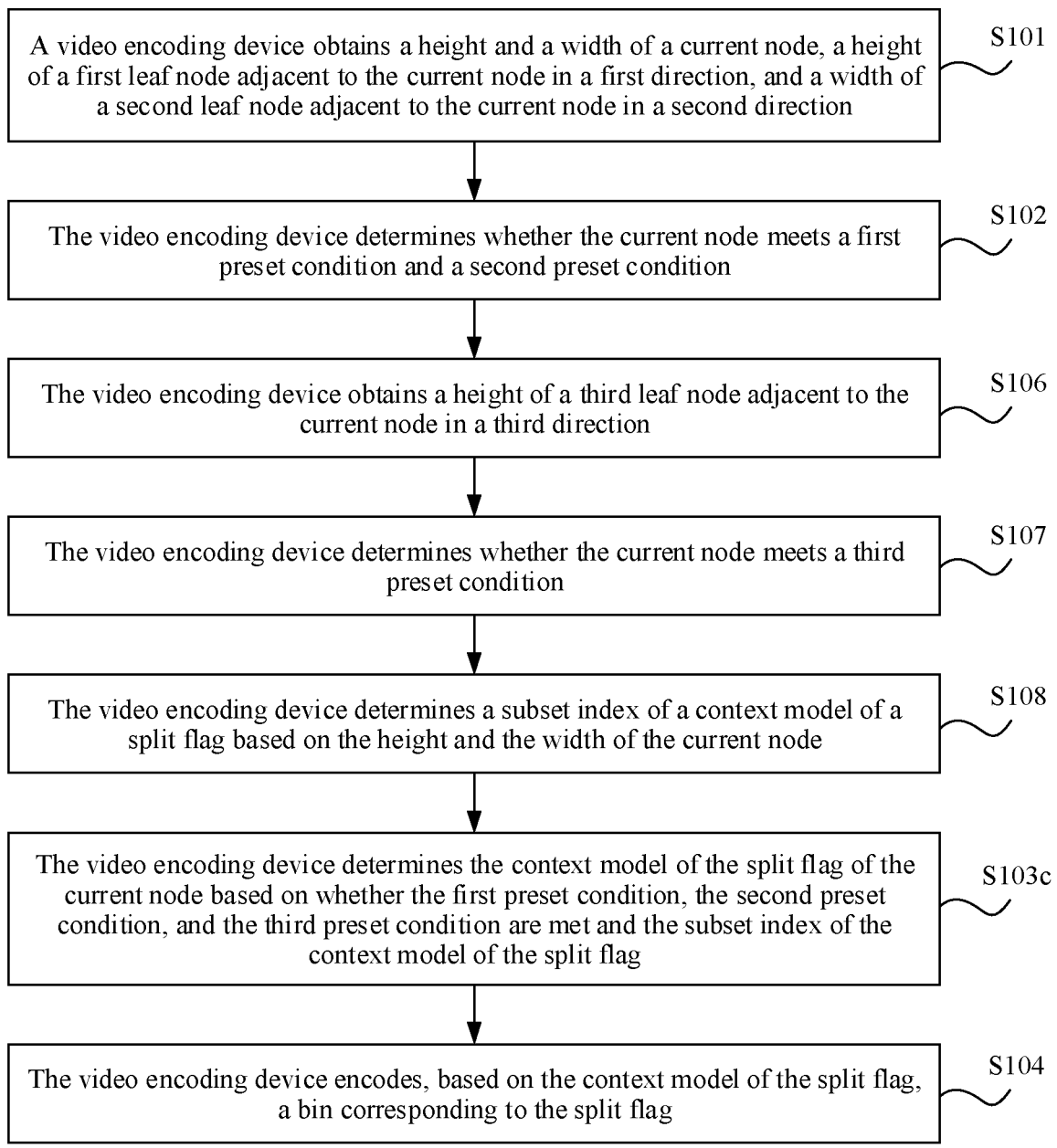
FIG. 10 is a fourth schematic diagram of a context modeling method of a split flag according to an embodiment of the present disclosure.

Optionally, with reference to FIG. 9, as shown in FIG. 10, in the context modeling method of the split flag provided in this embodiment of the present disclosure, S108 may be further included.

S108: The video encoding device determines a subset index of a context model of the split flag based on the height and the width of the current node.

It should be noted that S108 may be performed before or after S106, or S106 and S108 may be performed at the same time. S108 and S106 are not subject to a specific sequence in this embodiment of the present disclosure.

Optionally, as shown in FIG. 10, S103 may be specifically implemented through S103c.

S103c: The video encoding device determines the context model of the split flag of the current node based on whether the first preset condition, the second preset condition, and the third preset condition are met and the subset index of the context model of the split flag.

In this embodiment of the present disclosure, the foregoing method for determining the context model of the split flag of the current node based on whether the first preset condition, the second preset condition, and the third preset condition are met and the subset index of the context model of the split flag includes: determining the index of the context model of the split flag based on whether the first preset condition, the second preset condition, and the third preset condition are met and the subset index of the context model of the split flag of the current node. In an implementation, the index of the context model of the split flag meets:

$$ctxInc=\min(n\_conL+n\_conA+n\_conR,N)+X*A.$$

ctxInc represents the index of the context model of the split flag; n_conL represents whether the first preset condition is met, where when n_conL is 1, it indicates that the first preset condition is met, and when n_conL is 0, it indicates that the first preset condition is not met; n_conA represents whether the second preset condition is met, where when n_conA is 1, it indicates that the second preset condition is met, and when n_conA is 0, it indicates that the second preset condition is not met; n_conR represents whether the third preset condition is met, where when n_conR is 1, it indicates that the third preset condition is met, and when n_conR is 0, it indicates that the third preset condition is not met; X represents the subset index of the context model of the split flag; A represents a quantity of context models of the split flag that correspond to the subset index; and * represents multiplication.

According to the context modeling method of the split flag provided in this embodiment of the present disclosure, the subset index of the split flag of the current node may be determined based on the size of the current node, and the third preset condition is determined based on another leaf node adjacent to the current node. The context model, of the split flag, determined based on both whether the first preset condition, the second preset condition, and the third preset condition are met and the subset index of the context model of the split flag is more accurate. This can significantly improve efficiency of entropy coding of the split flag.

Figure 11:
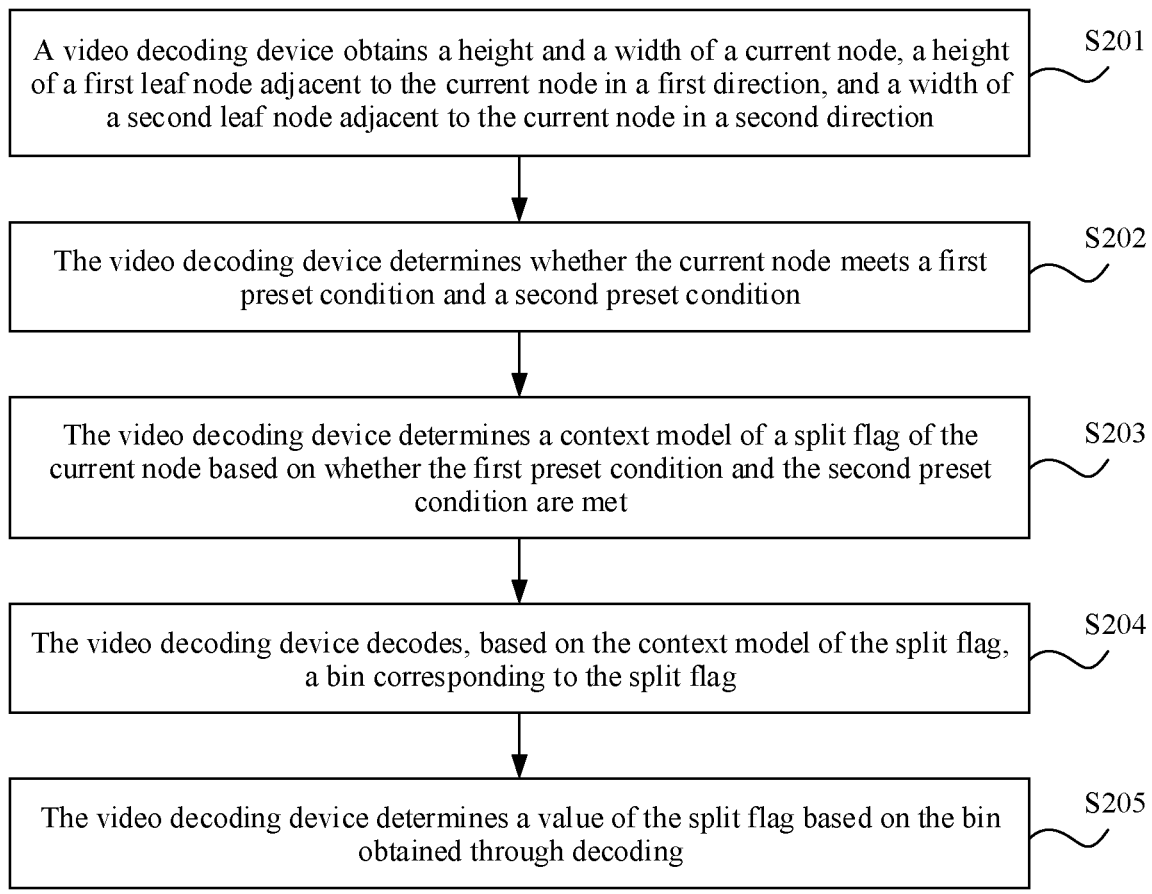
FIG. 11 is a fifth schematic diagram of a context modeling method of a split flag according to an embodiment of the present disclosure.

As shown in FIG. 11, in a process of decoding a split flag, a context modeling method of the split flag provided in an embodiment of the present disclosure may include S201 to S205.

S201: A video decoding device obtains a height and a width of a current node, a height of a first leaf node adjacent to the current node in a first direction, and a width of a second leaf node adjacent to the current node in a second direction.

S202. The video decoding device determines whether the current node meets a first preset condition and a second preset condition.

S203: The video decoding device determines a context model of a split flag of the current node based on whether the first preset condition and the second preset condition are met.

Steps S201 to S203 are similar to steps S101 to S103 performed by the video encoding device in the foregoing process of encoding the split flag. For specific descriptions of S201 to S203, refer to the foregoing detailed descriptions of S101 to S103. Details are not described herein again.

S204: The video decoding device decodes, based on the context model of the split flag, a bin corresponding to the split flag.

In this embodiment of the present disclosure, the video decoding device decodes a value of the bin based on a probability value of the bin corresponding to the split flag in a probability model.

S205: The video decoding device determines a value of the split flag based on the bin obtained through decoding.

In this embodiment of the present disclosure, after the video decoding device obtains the bin through decoding, the video decoding device may determine the split flag corresponding to the bin, to complete decoding the split flag, and determine, based on the split flag, whether the current node continues to be split. If the current node does not need to be further split, the current node is used as a coding unit, and the video decoding device parses coding information of the coding unit, to complete decoding the coding unit. If the current node continues to be split, the video decoding device parses a mode of splitting the current node into child nodes, that is, parses split mode information, and then parses a coding unit corresponding to each child node. Based on the foregoing processing process, a CTU is split into CUs, and each CU is decoded, to complete decoding video data.

When the context modeling method of the split flag provided in this embodiment of this disclosure is used for determining the context model of the split flag in the scenario of decoding the split flag, the video decoding device can more accurately determine, by comparing the height of the current node with the height of the first leaf node and comparing the width of the current node with the width of the second leaf node, whether the current node is to be further split. This can more accurately determine the context model of the split flag based on whether the foregoing two preset conditions are met, and improve efficiency of entropy coding of the split flag.

Further, when a binary tree split and/or a ternary tree split is used for splitting any node, the height of the current node may be compared with the height of the first leaf node and the width of the current node may be compared with the width of the second leaf node in this embodiment of the present disclosure, so that the context model of the split flag of the current node is determined more accurately. In this way, a prior-art problem that a context model, determined based on depth information, of the split flag of the current node is inaccurate can be well resolved. For example, when a depth of the current node is the same as a depth of the first leaf node, but the height of the current node is far greater than the height of the first leaf node, it is more likely to determine that the current node does not need to be further split in the prior art. Actually, because the height of the current node is comparatively large, there is a comparatively high probability that the current node should be further horizontally split.

Figure 12:
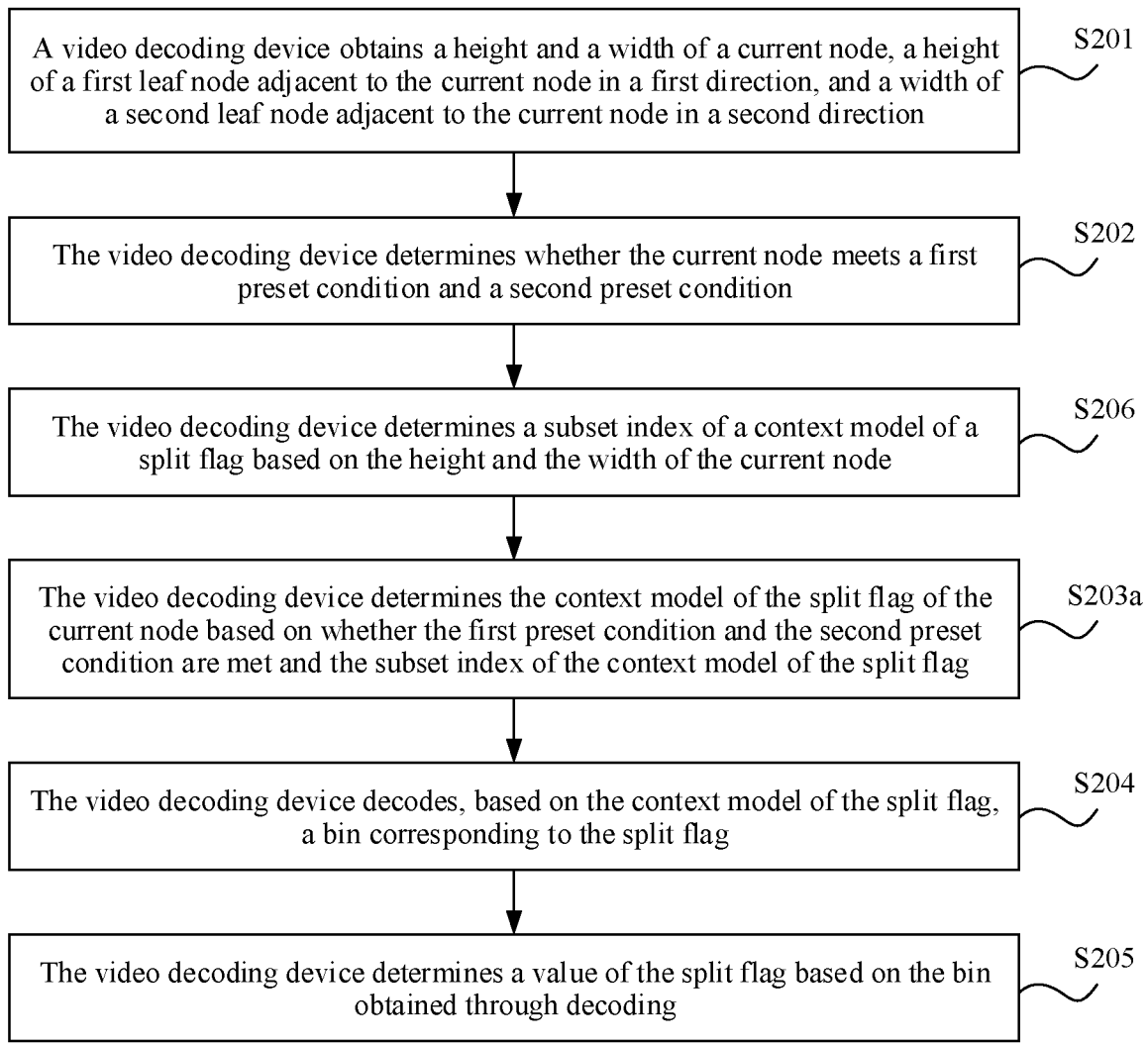
FIG. 12 is a sixth schematic diagram of a context modeling method of a split flag according to an embodiment of the present disclosure.

Optionally, with reference to FIG. 11, as shown in FIG. 12, in the context modeling method of the split flag provided in this embodiment of the present disclosure, before S203, S206 is further included.

S206: The video decoding device determines a subset index of the context model of the split flag based on the height and the width of the current node.

For a detailed description of S206, refer to the related description of S105 in the foregoing embodiment. Details are not described herein again.

In an optional implementation, S206 may be specifically implemented through S206a.

S206a: The video decoding device obtains an area of the current node based on the height and the width of the current node, and then determines the subset index of the context model of the split flag based on a preset mapping relationship between a node area and a subset index.

In another optional implementation, S206 may be specifically implemented through S206b.

S206b: The video decoding device queries a preset subset index query table for the subset index of the context model of the split flag based on the height and the width of the current node.

For a detailed description of S206a and S206b, refer to the related descriptions of S105a and S105b in the foregoing embodiment. Details are not described herein again.

Optionally, as shown in FIG. 12, S203 may be specifically implemented through S203a.

S203a: The video decoding device determines the context model of the split flag of the current node based on whether the first preset condition and the second preset condition are met and the subset index of the context model of the split flag.

For a detailed description of S203a, refer to the related description of S103a in the foregoing embodiment. Details are not described herein again.

Figure 13:
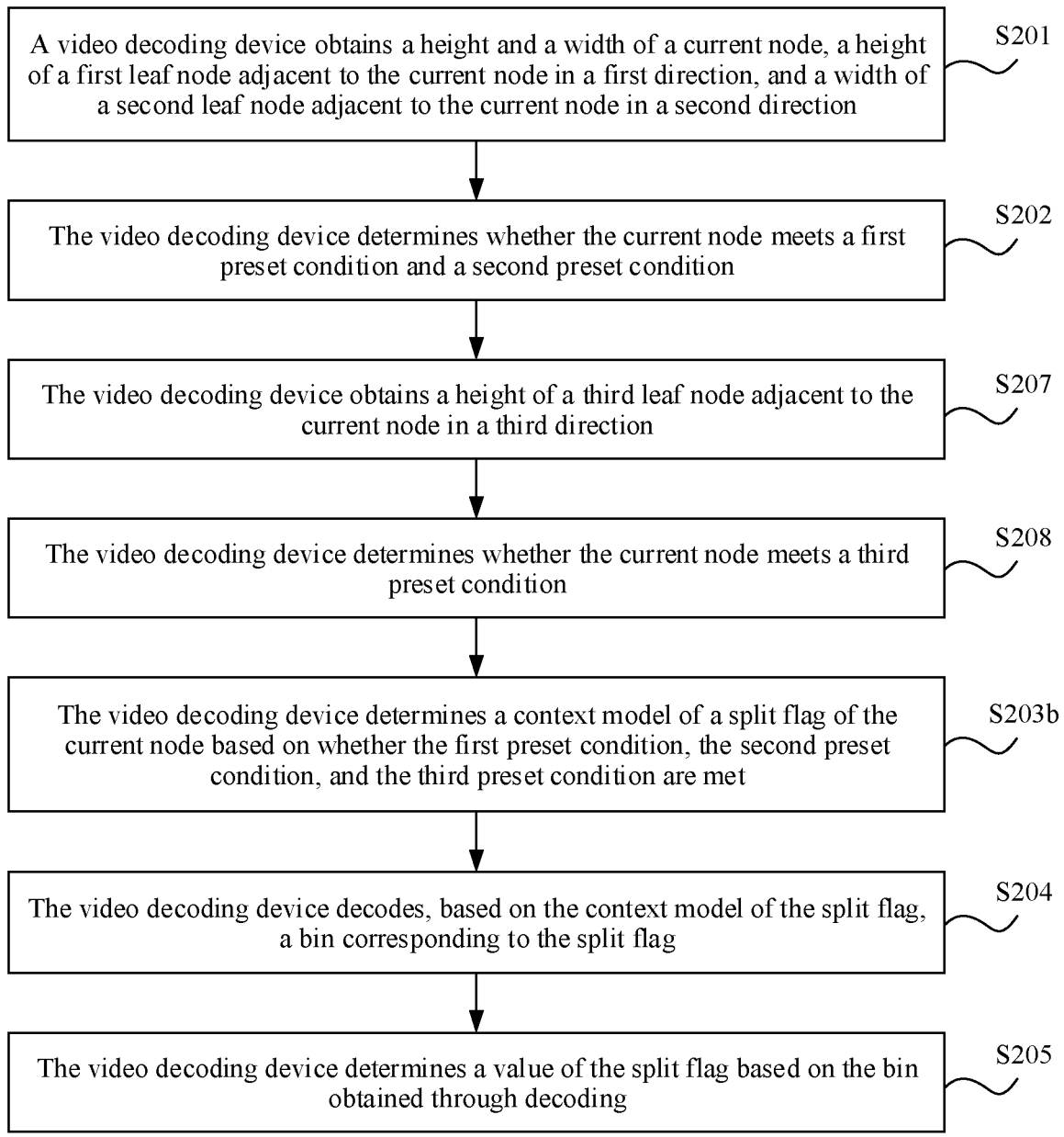
FIG. 13 is a seventh schematic diagram of a context modeling method of a split flag according to an embodiment of the present disclosure.

Optionally, with reference to FIG. 11, as shown in FIG. 13, in the context modeling method of the split flag provided in this embodiment of the present disclosure, before S203, S207 and S208 are further included.

S207: The video decoding device obtains a height of a third leaf node adjacent to the current node in a third direction.

S208. The video decoding device determines whether the current node meets a third preset condition.

For a detailed description of S207 and S208, refer to the related descriptions of S106 and S107 in the foregoing embodiment. Details are not described herein again.

Optionally, as shown in FIG. 13, S203 may be specifically implemented through S203b.

S203b: The video decoding device determines the context model of the split flag of the current node based on whether the first preset condition, the second preset condition, and the third preset condition are met.

For a detailed description of S203b, refer to the related description of S103b in the foregoing embodiment. Details are not described herein again.

Figure 14:
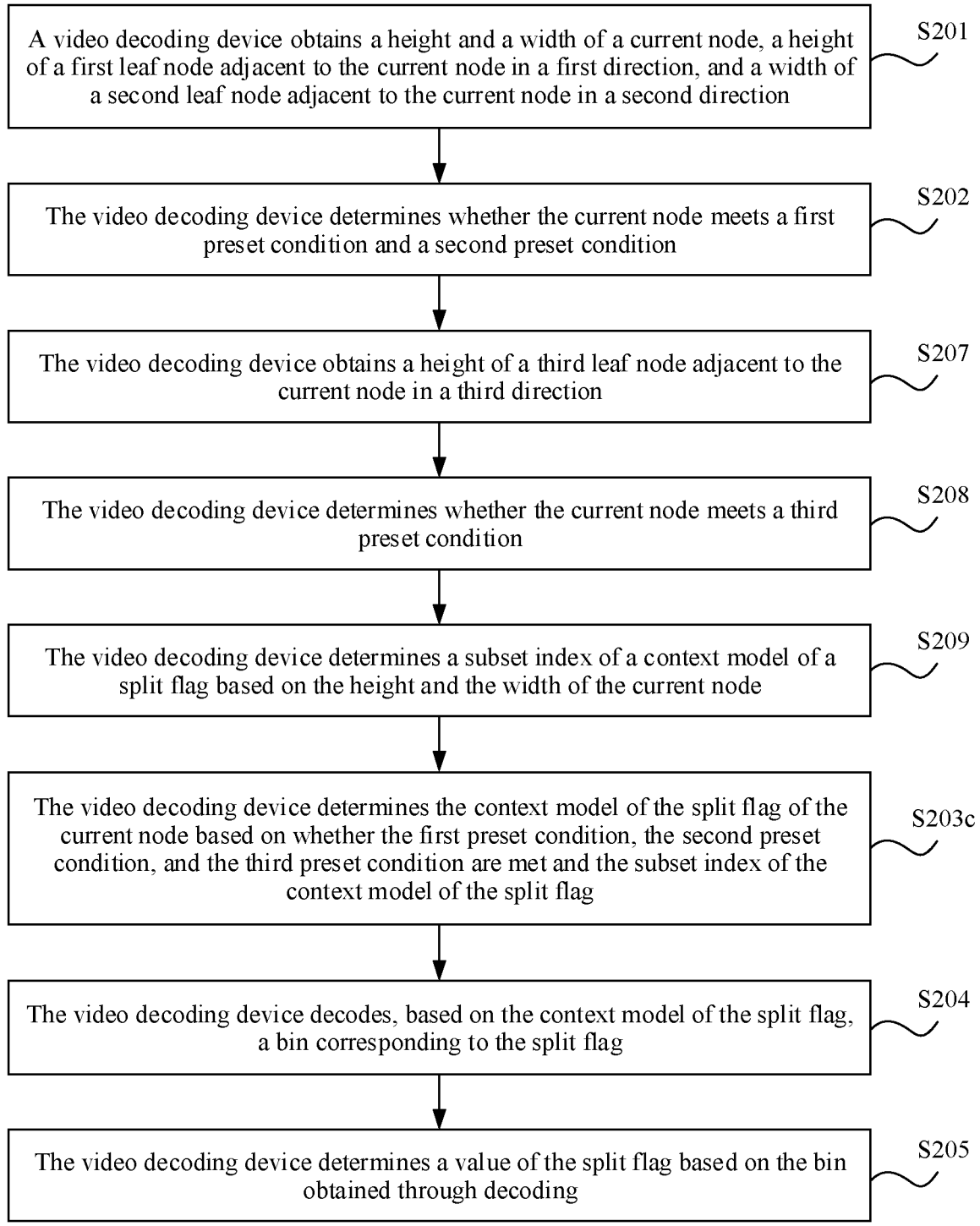
FIG. 14 is an eighth schematic diagram of a context modeling method of a split flag according to an embodiment of the present disclosure.

Optionally, with reference to FIG. 13, as shown in FIG. 14, in the context modeling method of the split flag provided in this embodiment of the present disclosure, S209 is further included.

S209: The video decoding device determines the subset index of the context model of the split flag based on the height and the width of the current node.

For a detailed description of S209, refer to the related description of S108 in the foregoing embodiment. Details are not described herein again.

Optionally, as shown in FIG. 14, S203 may be specifically implemented through S203c.

S203c: The video decoding device determines the context model of the split flag of the current node based on whether the first preset condition, the second preset condition, and the third preset condition are met and the subset index of the context model of the split flag.

For a detailed description of S203c, refer to the related description of S103c in the foregoing embodiment. Details are not described herein again.

In HEVC, for a picture in a YUV 4:2:0 format, a coding tree node includes one luma block and two chroma blocks. If the luma block and the chroma block are split in a same mode, a coding tree is referred to as a luma-chroma joint coding tree. In VVC, if a current frame is an I-frame, when a coding tree node is a node of a preset size (for example, 64×64) in an intra-coded frame (I-frame), a luma block included in the node is split, by a luma coding tree, into a group of coding units that include only luma blocks, and a chroma block included in the node is split, by a chroma coding tree, into a group of coding units that include only chroma blocks. Luma coding tree splitting and chroma coding tree splitting are independent of each other. Coding trees independently used for the luma block and chroma block are referred to as separate trees (separate trees).

Context-based adaptive binary arithmetic coding (Context-based Adaptive Binary Arithmetic Coding, CABAC) is a common entropy coding technology used for encoding and decoding processing performed on a syntax element value.

The encoding processing mainly includes three steps: (1) converting a binary syntax element into one or more binary bins (bin), where a value of each bin is 0 or 1; (2) determining a probability model C of each bin based on context information (for example, coding information in a reconstructed region around a node corresponding to the syntax element), where this step is usually referred to as context modeling; (3) encoding the bin based on a probability value in the probability model C, and updating the probability value in the probability model C based on the value of the bin.

The corresponding decoding process includes three steps: (1) determining the probability model C of each bin based on the context information; (2) decoding the bin based on the probability value in the probability model C, and updating the probability value in the probability model C based on the value of the bin; (3) obtaining values of the syntax element based on the value or values of the one or more bins obtained through decoding.

A context modeling method in the encoding processes is the same as a context modeling method in the decoding processes.

Generally, if a syntax element has only two values: 0 and 1, the syntax element is referred to as a flag (flag), and is binarized into one bin. A value 0 of the bin corresponds to the value 0 of the syntax element, and a value 1 of the bin corresponds to the value 1 of the syntax element.

Statistically, if a probability that a bin is 1 is closer to 0.5, more bits are required for encoding a group of such bins; and if a probability that a bin is 1 is closer to 0 or 1, fewer bits are required to encode a group of such bins. If a probability model is selected from a plurality of probability models based on the context information, a total probability that a bin is 1 may be divided into conditional probabilities that a bin is 1 in a plurality of cases, where each conditional probability may be closer to 0 or 1 in comparison with the total probability, so that fewer encoded bits are required and entropy coding efficiency is improved. However, if a context modeling method is inappropriate, the conditional probability may be close to the total probability, failing to improve the efficiency of entropy coding.

In the VVC draft 2 (VVC draft 2), an MTT split flag corresponds to three candidate context models whose indexes ctxInc are 0, 1, and 2. During encoding and decoding, a model is selected from the three candidate context models as an actually used model based on context information. Specifically, the context model of the split flag is determined based on an area of the current node, an area of a left-side leaf node, and an area of an upper-side leaf node. The left-side leaf node is a leaf node that covers a preset position on a left side of the current node, and the upper-side leaf node is a leaf node that covers a preset position on an upper side of the current node. If the MTT split flag is 1, it indicates that the current node is split using the binary tree split or the ternary tree split. If the MTT split flag is 0, it indicates that the current node is not split, that is, the current node corresponds to a coding unit.

In the VVC draft 2, an area of a node is represented by twice a quadtree depth Dq of the node plus a binary tree depth Db of the node. When a node is split using the quadtree split, Dq of a child node i is equal to Dq of the node plus 1. When a node is split using the binary tree split or the ternary tree split, Dq of a child node is equal to Dq of the node. When a node is split using the binary tree split, Db of a child node is equal to Db of the node plus 1. When a node is split using the ternary tree split and a child node is an intermediate node in the ternary tree split, Db of the child node is equal to Db of the node plus 1. When a node is split using the ternary tree split and a child node is not an intermediate node in the ternary tree split, Db of the child node is equal to Db of the node plus 2.

Condition 1: If the left-side leaf node is available (the left-side leaf node is within a picture region and has been reconstructed) and the area of the left-side leaf node is less than the area of the current node, a condition condL is met; otherwise, the condition condL is not met.

Condition 2: If the upper-side leaf node is available and an area of the upper-side leaf node is less than the area of the current node, a condition condA is met; otherwise, the condition condA is not met.

The context model used for the split flag is determined based on a quantity of conditions that are met in the foregoing conditions, that is, ctxInc=condL+condA. If no condition is met, a model 0 is used; if one condition is met, a model 1 is used; and if two conditions are met, a model 2 is used.

In the VVC draft 2, regardless of whether a luma-chroma joint tree or a separate tree (that is, a luma coding tree or a chroma coding tree) is used, the foregoing three context models are used for the MTT split flag.

In some other prior arts, the condition 1 is replaced with: If the left-side leaf node is available and a height of the left-side leaf node is less than the height of the current node, the condition condL is met; otherwise, the condition condL is not met; and the condition 2 is replaced with: If the upper-side leaf node is available and a width of the upper-side leaf node is less than the width of the current node, the condition condA is met; otherwise, the condition condA is not met.

In an embodiment of the present disclosure, the context model of the MTT split flag may be determined based on a type of the coding tree, and different context models are used for the MTT split flag of the luma coding tree and the split flag of the chroma coding tree, to improve coding efficiency of the MTT split flag.

An embodiment of the present disclosure provides a method for determining a context model of a split flag. The method is applied to a video encoding device or a video decoding device. A node that is being determined whether to be split in a coding tree is referred to as a current node. A split flag is used to indicate whether the current node continues to be split. The split flag in the present disclosure may be an MTT split flag, for example, mtt_split_cu_flag in the VVC draft 2. If the MTT split flag is 1, it indicates that the current node is split into child nodes using a binary tree split or a ternary tree split. If the MTT split flag is 0, it indicates that the current node is not split and is a coding unit CU in a QT-MTT coding tree. The split flag in the present disclosure may alternatively be a QT split flag, for example, qt_split_cu_flag in the VVC draft 2.

Figure 19:
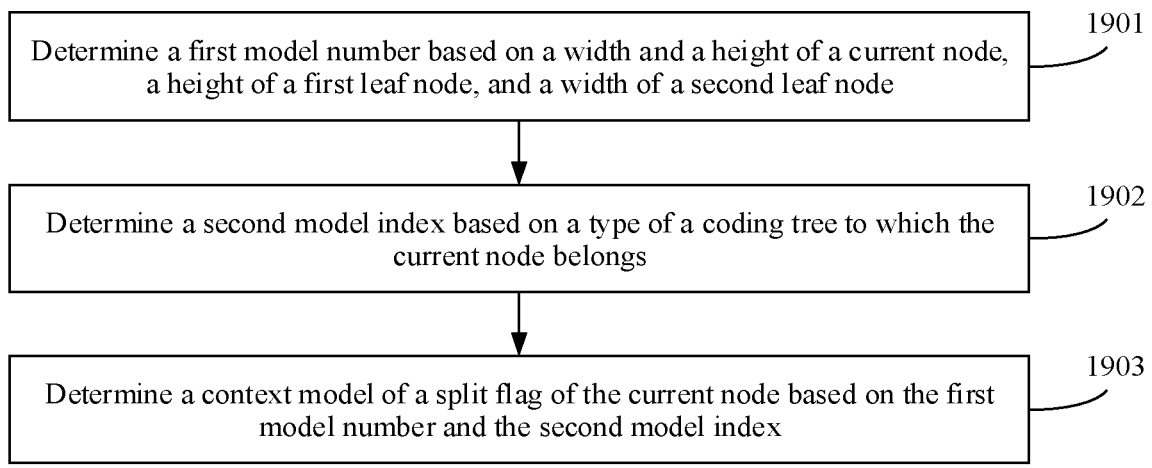
FIG. 19 is a ninth schematic diagram of a context modeling method of a split flag according to an embodiment of the present disclosure.

As shown in FIG. 19, a method for determining a context model of a split flag according to an embodiment of the present disclosure includes the following steps.

1901: Determine a first model index based on a width and a height of a current node, a height of a first leaf node, and a width of a second leaf node, where the first leaf node is adjacent to the current node in a first direction, the second leaf node is adjacent to the current node in a second direction, the first direction is perpendicular to the second direction, and the first leaf node and the second leaf node are reconstructed leaf nodes. The first direction is, for example, a left direction of the current node, and the second direction is, for example, an upper direction of the current node.

For implementation of this step, refer to a prior-art method or the method for determining the context model of the split flag provided in the foregoing embodiment. Details are not described herein again. For example, a method for determining a context model of a split flag in HEVC may be used, or a method for determining a context model of a split flag in VVC draft 2 may be used. Alternatively, for example, any one of the methods for determining the context model of the split flag described in FIG. 5, FIG. 7, and FIG. 9 to FIG. 14 may be used. In other words, the first model index obtained in this step may be the determined index of the context model in the foregoing method.

1902: Determine a second model index based on a type of a coding tree to which the current node belongs.

The coding tree of the current node may be a chroma coding tree, a luma coding tree, or a luma-chroma joint tree.

The second model index or a manner of determining the second model index varies with the type of the coding tree to which the current node belongs.

For example, in an implementation, if the coding tree to which the current node belongs is the chroma coding tree, it is determined that the second model index is a first value, where the first value is a preset positive integer. For example, the first value may be 3, 6, 9, 10, 12, or 13.

In an implementation, if the coding tree to which the current node belongs is the luma coding tree or the luma-chroma joint tree, the second model index is determined based on a value relationship between an MTT depth of the current node and an MTT depth threshold ThD. Specifically, if the MTT depth of the current node is less than the MTT depth threshold ThD, it is determined that the second model index is a second value, where the second value is a nonnegative integer, for example, 0, 1, or 2; or if the MTT depth of the current node is greater than or equal to the MTT depth threshold ThD, it is determined that the second model index is a third value, where the third value is a nonnegative integer, for example, 3, 4, or 5. The first value, the second value, and the third value are different from each other. For example, the second value may be 0, the third value may be 3, and the first value may be 6.

In an implementation, the MTT depth threshold ThD may be a preset positive integer, for example, 2, 3, or 4. In another implementation, the MTT depth threshold ThD may be determined based on a maximum MTT depth (MaxMttDepth) corresponding to the current node, for example, ThD=(MaxMttDepth+1)>>1. For example, in the VVC draft 2, if the current node is a node in an I frame, the maximum MTT depth MaxMttDepth corresponding to the current node is determined based on a syntax element max_mtt_hierarchy_depth_intra_slices in a sequence parameter set (Sequence Parameter Set, SPS); or if the current node is a node in a P-frame or a B-frame, the maximum MTT depth MaxMttDepth corresponding to the current node is determined based on a syntax element max_mtt_hierarchy_depth_inter_slices in a sequence parameter set.

In an implementation, if the coding tree to which the current node belongs is the luma coding tree or the luma-chroma joint tree, the second model index is determined based on a product of the MTT depth of the current node and a preset constant P1. For example, the product may be directly determined as the second model index. In some implementations, in consideration of a value range of the second model index, an upper limit of the second model index may be set. To be specific, when the product is greater than the upper limit, the upper limit is determined as the second model index. For example, in one embodiment, the upper limit is set to 6, that is, if the product is greater than 6, the second model index is 6. In an implementation, when the second model index is determined based on the product of the MTT depth of the current node and the preset constant P1, the first value may be set to an integer greater than or equal to 9. The preset constant P1 is a positive integer. For example, P1 is equal to 3.

In an implementation, if the coding tree to which the current node belongs is the luma coding tree or the luma-chroma joint tree, the second model index is determined based on a value relationship between an area of the current node and a first preset area threshold ThA1. Specifically, if the area of the current node is greater than the first preset area threshold ThA1, it is determined that the second model index is a fourth value, where the fourth value is a nonnegative integer, for example, the fourth value may be 0, 1, or 2; or if the area of the current node is less than or equal to the first preset area threshold ThA1, it is determined that the second model index is a fifth value, where the fifth value is a nonnegative integer, for example, the fifth value may be 3, 4, or 5. The first value, the fourth value, and the fifth value are different from each other. For example, the fourth value may be 0, the fifth value may be 3, and the first value may be 6.

The first preset area threshold ThA1 is a positive integer, for example, ThA1 is 128, 256, 512, or 1024. Alternatively, ThA1 may be determined based on a size of a maximum binary tree split node of a current picture. For example, when the maximum binary tree split node is 128×128, ThA1 is set to 512 or 256; when the maximum binary tree split node is 64×64, ThA1 is set to 256 or 128; and when the maximum binary tree split node is 32×32 or smaller, ThA1 is set to 128 or 64. Alternatively, ThA1 may be determined based on a frame type of the current picture. If the current picture is an I-frame, ThA1 is 256 or 128; otherwise, ThA1 is 1024 or 512. The area of the current node may be calculated as a product of a width and a height of a picture block included in the current node. If the current node is a node in the luma coding tree or the luma-chroma joint tree, the picture block included in the current node is a luma block, and the area of the current node is a product of the width and the height of the luma block. If the current node is a node in the chroma coding tree, the picture block included in the current node is a chroma block, and the area of the current node is a product of the width and the height of the chroma block. Alternatively, the area of the current node may be calculated as a product of a width and a height of a picture region corresponding to the current node. If the current node corresponds to a 16×16 picture region, the area of the current node is 256.

In an implementation, if the coding tree to which the current node belongs is the luma coding tree or the luma-chroma joint tree, the second model index is determined based on a value relationship between an area of the current node and at least one of a second preset area threshold ThA2 and a third preset area threshold ThA3, where the second preset area threshold ThA2 is greater than the third preset area threshold ThA3. Specifically, if the area of the current node is greater than the second area threshold ThA2, it is determined that the second model index is a sixth value, where the sixth value is a nonnegative integer, for example, 0, 1, or 2; if the area of the current node is greater than the third area threshold ThA3 and less than or equal to the second area threshold ThA2, it is determined that the second model index is a seventh value, where the seventh value is a nonnegative integer, for example, 3, 4, or 5; or if the area of the current node is less than or equal to the third area threshold ThA3, it is determined that the second model index is an eighth value, where the eighth value is a nonnegative integer, for example, 6, 7, or 8. The first value, the sixth value, the seventh value, and the eighth value are different from each other. For example, the sixth value may be 0, the seventh value may be 3, the eighth value may be 6, and the first value may be 9.

The second preset area threshold ThA2 is a positive integer, for example, ThA2 is 256, 512, 1024, or 2048. Alternatively, ThA2 may be determined based on a size of a maximum binary tree split node of the current picture. For example, when the maximum binary tree split node is 128×128, ThA2 is set to 1024 or 512; when the maximum binary tree split node is 64×64, ThA2 is set to 512 or 256; and when the maximum binary tree split node is 32×32 or smaller, ThA2 is set to 256 or 128. Alternatively, ThA2 may be determined based on a frame type of the current picture. If the current picture is an I-frame, ThA2 is 1024 or 512; otherwise, ThA2 is 256 or 128.

The third preset area threshold ThA3 is a positive integer, for example, ThA3 is 32, 64, 128, 256, or 512. ThA3 may be determined based on a size of a maximum binary tree split node of a current picture. For example, when the maximum binary tree split node is 128×128, ThA3 is set to 512 or 256; when the maximum binary tree split node is 64×64, ThA3 is set to 128 or 64; and when the maximum binary tree split node is 32×32 or smaller, ThA3 is set to 64 or 32. Alternatively, ThA3 may be determined based on a frame type of the current picture. If the current picture is an I-frame, ThA3 is 256 or 128; otherwise, ThA3 is 64 or 32.

It should be noted that step 1901 and step 1902 are not subject to a specific sequence. In other words, step 1902 may be performed before or after step 1901, or step 1901 and step 1902 may be performed at the same time.

1903: Determine the context model of the split flag of the current node based on the first model index and the second model index.

For example, a sum of the first model index and the second model index may be directly used as the index of the context model of the split flag of the current node, to determine the context model of the split flag of the current node based on the index. When the method is applied to an encoder, the method may be specifically performed by an entropy encoding unit. In this case, the entropy encoding unit may encode a bin of the context model based on the context model, and then write an encoded bin into a bitstream. When the method is applied to a decoder, the method may be specifically performed by an entropy decoding unit. After determining the context model of the split flag of the current node, the entropy decoding unit may decode the bitstream based on the context model, to obtain a value of the bin corresponding to the split flag, and then determine a value of the split flag based on the value of the bin, and further determine, based on the value of the split flag, whether the current node needs to be further split.

It can be learned from the foregoing that the context model of the split flag of the current node may be determined based on the type of the coding tree to which the current node belongs in this embodiment, so that different context models may be used for the chroma coding tree and a non-chroma coding tree (that is, the luma coding tree or the luma-chroma joint tree). In this way, the determined context model can adapt to the chroma coding tree and the non-chroma coding tree, thereby improving compression efficiency.

In another embodiment of the present disclosure, step 1902 in which the second model index is determined based on the type of the coding tree to which the current node belongs may include: The second model index is determined based on the type of the coding tree to which the current node belongs and the value relationship between the MTT depth of the current node and the MTT depth threshold ThD. For the MTT depth threshold ThD or the determining of the MTT depth threshold ThD, refer to the foregoing descriptions.

Specifically, if the coding tree to which the current node belongs is the chroma coding tree, and the MTT depth of the current node is less than the MTT depth threshold ThD, it is determined that the second model index is a ninth value, where the ninth value is a nonnegative integer, for example, 6, 7, or 8; if the coding tree to which the current node belongs is the chroma coding tree, and the MTT depth of the current node is greater than or equal to the MTT depth threshold ThD, it is determined that the second model index is a tenth value, where the tenth value is a nonnegative integer, for example, 9, 10, or 11; if the coding tree to which the current node belongs is the luma coding tree or the luma-chroma joint tree, and the MTT depth of the current node is less than the MTT depth threshold ThD, it is determined that the second model index is an eleventh value, where the eleventh value is a nonnegative integer, for example, 0, 1, or 2; or if the coding tree to which the current node belongs is the luma coding tree or the luma-chroma joint tree, and the MTT depth of the current node is greater than or equal to the MTT depth threshold ThD, it is determined that the second model index is a twelfth value, where the twelfth value is a nonnegative integer, for example, 3, 4, or 5. The ninth value, the tenth value, the eleventh value, and the twelfth value are different from each other. For example, the ninth value may be 6, the tenth value may be 9, the eleventh value may be 0, and the twelfth value may be 3.

It can be learned from the foregoing that the context model of the split flag of the current node may be determined based on the type of the coding tree to which the current node belongs in this embodiment, so that different context models may be used for the chroma coding tree and a non-chroma coding tree (that is, the luma coding tree or the luma-chroma joint tree). In this way, the determined context model can adapt to the chroma coding tree and the non-chroma coding tree, thereby improving compression efficiency.

Figure 20:
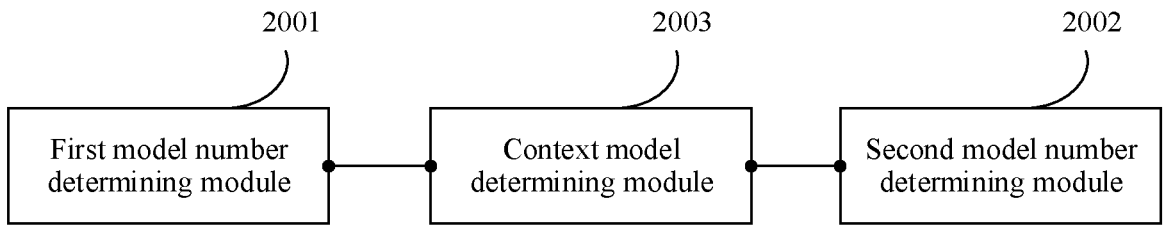
FIG. 20 is a schematic diagram of a context modeling apparatus of a split flag according to an embodiment of the present disclosure.

FIG. 20 shows a structure of a context modeling apparatus of a split flag according to an embodiment of the present disclosure. The apparatus may be specifically a video encoder or a video decoder, or the apparatus may be an entropy encoding unit in a video encoder, or an entropy decoding unit in a video decoder. As shown in FIG. 20, the apparatus includes the following modules.

A first model index determining module 2001 is configured to determine a first model index based on a width and a height of a current node, a height of a first leaf node, and a width of a second leaf node, where the first leaf node is adjacent to the current node in a first direction, the second leaf node is adjacent to the current node in a second direction, the first direction is perpendicular to the second direction, and the first leaf node and the second leaf node are reconstructed leaf nodes.

For specific implementation, refer to step 1901.

A second model index determining module 2002 is configured to determine a second model index based on a type of a coding tree to which the current node belongs.

For specific implementation, refer to step 1902.

A context model determining module 2003 is configured to determine a context model of a split flag of the current node based on the first model index and the second model index.

For specific implementation, refer to step 1903.

For example, in an implementation, the second model index determining module 2002 may be specifically configured to: when the coding tree to which the current node belongs is a chroma coding tree, determine that the second model index is a first value, where the first value is a preset positive integer.

For example, in an implementation, the second model index determining module 2002 may be specifically configured to: when the coding tree to which the current node belongs is a luma coding tree or a luma-chroma joint tree, determine the second model index based on a value relationship between an MTT depth of the current node and an MTT depth threshold ThD. Specifically, the second model index determining module 2002 may be specifically configured to: when the MTT depth of the current node is less than the MTT depth threshold ThD, determine that the second model index is a second value, where the second value is a nonnegative integer; or when the MTT depth of the current node is greater than or equal to the MTT depth threshold ThD, determine that the second model index is a third value, where the third value is a nonnegative integer; where the first value, the second value, and the third value are different from each other. The MTT depth threshold ThD is determined based on a maximum MTT depth corresponding to the current node. For a specific determining manner, refer to the foregoing descriptions.

For example, in an implementation, the second model index determining module 2002 may be specifically configured to: when the coding tree to which the current node belongs is a luma coding tree or a luma-chroma joint tree, determine the second model index based on a product of the MTT depth of the current node and a preset constant P1. Specifically, the product is the second model index, or if the product is greater than 6, the second model index is 6. In this implementation, the first value may be an integer greater than or equal to 9.

For example, in an implementation, the second model index determining module 2002 may be specifically configured to: when the coding tree to which the current node belongs is a luma coding tree or a luma-chroma joint tree, determine the second model index based on a value relationship between an area of the current node and a first preset area threshold ThA1. Specifically, when the area of the current node is greater than the first preset area threshold ThA1, the second model index determining module 2002 determines that the second model index is a fourth value, where the fourth value is a nonnegative integer; or when the area of the current node is less than or equal to the first preset area threshold ThA1, the second model index determining module 2002 determines that the second model index is a fifth value, where the fifth value is a nonnegative integer; where the first value, the fourth value, and the fifth value are different from each other.

For example, in an implementation, the second model index determining module 2002 may be specifically configured to: when the coding tree to which the current node belongs is a luma coding tree or a luma-chroma joint tree, determine the second model index based on a value relationship between an area of the current node and at least one of a second preset area threshold ThA2 and a third preset area threshold ThA3, where the second preset area threshold ThA2 is greater than the third preset area threshold ThA3. Specifically, the second model index determining module 2002 is specifically configured to: when the area of the current node is greater than the second area threshold ThA2, determine that the second model index is a sixth value, where the sixth value is a nonnegative integer; when the area of the current node is greater than the third area threshold ThA3 and less than or equal to the second area threshold ThA2, determine that the second model index is a seventh value, where the seventh value is a nonnegative integer; or when the area of the current node is less than or equal to the third area threshold ThA3, determine that the second model index is an eighth value, where the eighth value is a nonnegative integer; where the first value, the sixth value, the seventh value, and the eighth value are different from each other.

For example, in an implementation, the second model index determining module 2002 may be specifically configured to determine the second model index based on the type of the coding tree to which the current node belongs and a value relationship between an MTT depth of the current node and an MTT depth threshold ThD. For example, the second model index determining module 2002 may be specifically configured to: when the coding tree to which the current node belongs is a chroma coding tree, and the MTT depth of the current node is less than the MTT depth threshold ThD, determine that the second model index is a ninth value, where the ninth value is a nonnegative integer; when the coding tree to which the current node belongs is a chroma coding tree, and the MTT depth of the current node is greater than or equal to the MTT depth threshold ThD, determine that the second model index is a tenth value, where the tenth value is a nonnegative integer; when the coding tree to which the current node belongs is a luma coding tree or a luma-chroma joint tree, and the MTT depth of the current node is less than the MTT depth threshold ThD, determine that the second model index is an eleventh value, where the eleventh value is a nonnegative integer; or when the coding tree to which the current node belongs is a luma coding tree or a luma-chroma joint tree, and the MTT depth of the current node is greater than or equal to the MTT depth threshold ThD, determine that the second model index is a twelfth value, where the twelfth value is a nonnegative integer; where the ninth value, the tenth value, the eleventh value, and the twelfth value are different from each other.

Specifically, for the first value to the twelfth value, refer to the foregoing descriptions. For the thresholds, refer to the foregoing descriptions. Details are not described herein again.

It can be learned from the foregoing that the context model of the split flag of the current node may be determined based on the type of the coding tree to which the current node belongs in this embodiment, so that different context models may be used for the chroma coding tree and a non-chroma coding tree (that is, the luma coding tree or the luma-chroma joint tree). In this way, the determined context model can adapt to the chroma coding tree and the non-chroma coding tree, thereby improving compression efficiency.

The foregoing mainly describes the solutions provided in the embodiments of the present disclosure from a perspective of interaction between the network elements. It can be understood that to implement the foregoing functions, the network elements such as the video encoding device and the video decoding device each include a corresponding hardware structure and/or a corresponding software module that perform/performs the functions. A person of ordinary skill in the art should be easily aware that, in combination with the examples described in the embodiments disclosed in this specification, units, algorithms, and steps may be implemented by hardware or a combination of hardware and computer software. Whether a function is performed by hardware or hardware driven by computer software depends on particular disclosures and design constraints of the technical solutions. A person skilled in the art may use different methods to implement the described functions for each particular disclosure, but it should not be considered that the implementation goes beyond the scope of this disclosure.

In the embodiments of the present disclosure, division into functional modules may be performed on the video encoding device and the video decoding device based on the foregoing method examples. For example, division into functional modules may be performed based on corresponding functions, or two or more functions may be integrated into one processing module. The integrated module may be implemented in a form of hardware, or may be implemented in a form of a software functional module. It should be noted that in the embodiments of the present disclosure, division into modules is an example, and division into modules is merely logical function division and may be other division in an actual implementation.

Figure 15:
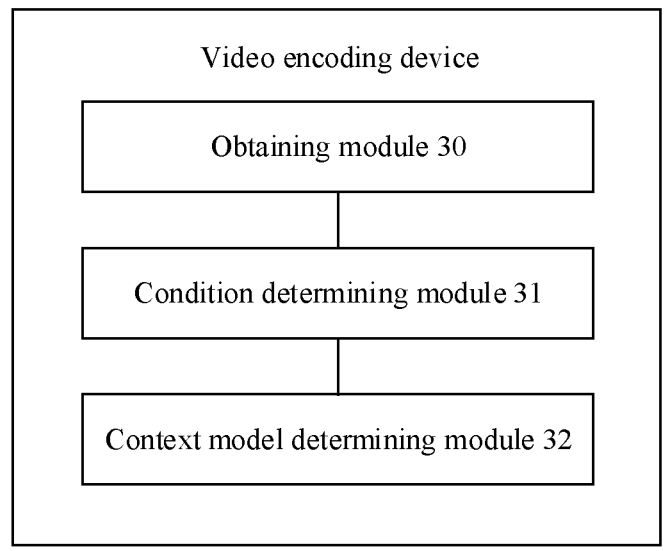
FIG. 15 is a first schematic structural diagram of a video encoding device according to an embodiment of the present disclosure.

When division into functional modules is performed based on corresponding functions, FIG. 15 is a possible schematic structural diagram of a video encoding device in the foregoing embodiments. As shown in FIG. 15, the video encoding device may include an obtaining module 30, a condition determining module 31, and a context model determining module 32. The obtaining module 30 may be configured to support the video encoding device to perform S101 and S106 in the foregoing method embodiment. The condition determining module 31 may be configured to support the video encoding device to perform S102 and S107 in the foregoing method embodiment. The context model determining module 32 may be configured to support the video encoding device to perform S103 (including S103*a*, S103*b*, or S103*c*), S105 (including S105*a* or S105*b*), and S108 in the foregoing method embodiment. All related content of the steps in the foregoing method embodiment may be cited in functional descriptions of the corresponding functional modules. Details are not described herein again.

Figure 16:
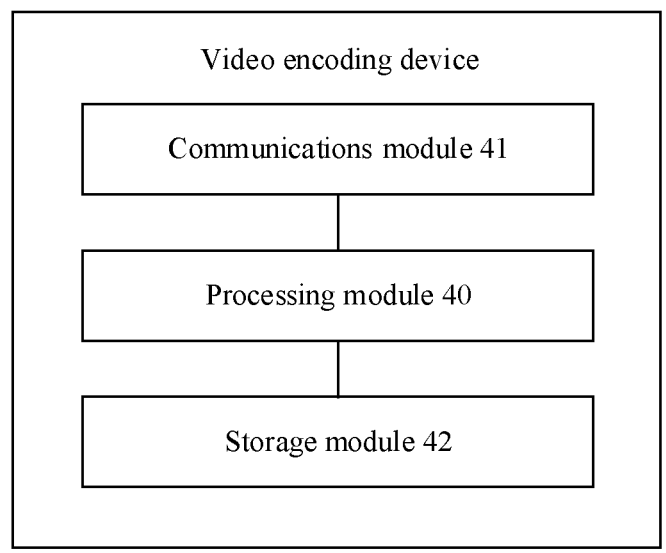
FIG. 16 is a second schematic structural diagram of a video encoding device according to an embodiment of the present disclosure.

When an integrated unit is used, FIG. 16 is a possible schematic structural diagram of a video encoding device in the foregoing embodiments. As shown in FIG. 16, the video encoding device may include a processing module 40 and a communications module 41. The processing module 40 may be configured to control and manage an action of the video encoding device. The processing module 40 may be configured to support the video encoding device to perform S102, S103 (including S103*a*, S103*b*, or S103*c*), S105 (including S105*a* or S105*b*), S107, and S108 in the foregoing method embodiment, and/or another process used for the technology described in this specification. The communications module 41 may be configured to support the video encoding device to communicate with another network entity. Optionally, as shown in FIG. 16, the video encoding device may further include a storage module 42, configured to store program code and data of the video encoding device.

The processing module 40 may be a processor or a controller (for example, the processing module 40 may be the video encoder 12 shown in FIG. 3). For example, the processing module 40 may be a CPU, a general-purpose processor, a DSP, an ASIC, an FPGA or another programmable logic device, a transistor logic device, a hardware component, or any combination thereof. The processing module 40 may implement or execute various example logical blocks, modules, and circuits described with reference to content disclosed in the embodiments of the present disclosure. Alternatively, the processor may be a combination of processors implementing a computation function, for example, a combination that includes one or more microprocessors, or a combination of a DSP and a microprocessor. The communications module 41 may be a transceiver, a transceiver circuit, a communications interface, or the like (for example, the communications module 41 may be the output interface 13 shown in FIG. 3). The storage module 42 may be a memory (for example, the storage module 42 may be the memory 11 shown in FIG. 3).

When the processing module 40 is a processor, the communications module 41 is a transceiver, and the storage module 42 is a memory, the processor, the transceiver, and the memory may be connected to each other through a bus. The bus may be a peripheral component interconnect (peripheral component interconnect, PCI) bus, an extended industry standard architecture (extended industry standard architecture, EISA) bus, or the like. The bus may be classified into an address bus, a data bus, a control bus, or the like.

Figure 17:
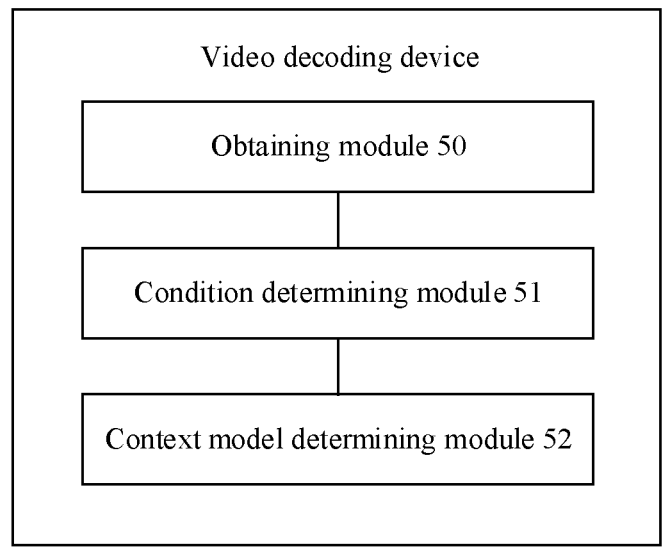
FIG. 17 is a first schematic structural diagram of a video decoding device according to an embodiment of the present disclosure.

When division into functional modules is performed based on corresponding functions, FIG. 17 is a possible schematic structural diagram of a video decoding device in the foregoing embodiments. As shown in FIG. 17, the video decoding device may include an obtaining module 50, a condition determining module 51, and a context model determining module 52. The obtaining module 50 may be configured to support the video decoding device to perform S201 and S207 in the foregoing method embodiment. The condition determining module 51 may be configured to support the video decoding device to perform S202 and S208 in the foregoing method embodiment. The context model determining module 52 may be configured to support the video decoding device to perform S203 (including S203a, S203b, or S203c), S205, S206 (including S206a or S206b), and S209 in the foregoing method embodiment. All related content of the steps in the foregoing method embodiment may be cited in functional descriptions of the corresponding functional modules. Details are not described herein again.

Figure 18:
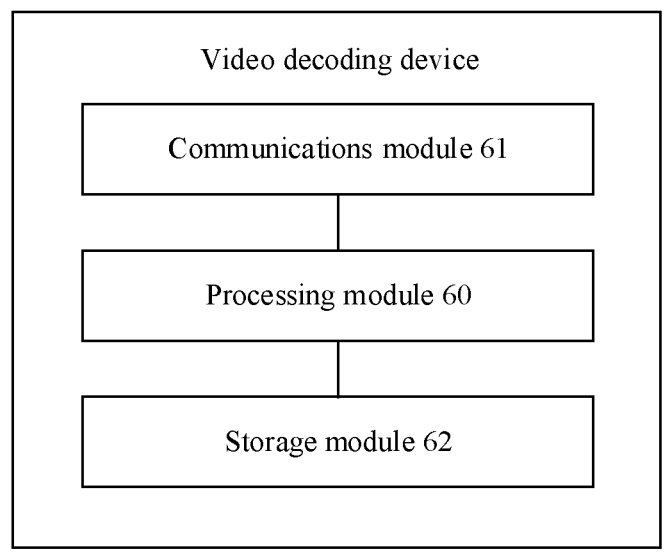
FIG. 18 is a second schematic structural diagram of a video decoding device according to an embodiment of the present disclosure.

When an integrated unit is used, FIG. 18 is a possible schematic structural diagram of a video decoding device in the foregoing embodiments. As shown in FIG. 18, the video decoding device may include a processing module 60 and a communications module 61. The processing module 60 may be configured to control and manage an action of the video decoding device. The processing module 60 may be configured to support the video decoding device to perform S202, S203 (including S203a, S203b, or S203c), S204, S205, S206 (including S206a or S206b), S208, and S209 in the foregoing method embodiment, and/or another process used for the technology described in this specification. The communications module 61 may be configured to support the video decoding device to communicate with another network entity. Optionally, as shown in FIG. 18, the video decoding device may further include a storage module 62, configured to store program code and data of the video decoding device.

The processing module 60 may be a processor or a controller (for example, the processing module 60 may be the video decoder 21 shown in FIG. 4). For example, the processing module 60 may be a CPU, a general-purpose processor, a DSP, an ASIC, an FPGA or another programmable logic device, a transistor logic device, a hardware component, or any combination thereof. The processing module 60 may implement or execute various example logical blocks, modules, and circuits described with reference to content disclosed in the embodiments of the present disclosure. Alternatively, the processor may be a combination of processors implementing a computation function, for example, a combination that includes one or more microprocessors, or a combination of a DSP and a microprocessor. The communications module 61 may be a transceiver, a transceiver circuit, a communications interface, or the like (for example, the communications module 61 may be the input interface 20 shown in FIG. 4). The storage module 62 may be a memory.

When the processing module 60 is a processor, the communications module 61 is a transceiver, and the storage module 62 is a memory, the processor, the transceiver, and the memory may be connected to each other through a bus. The bus may be a PCI bus, an EISA bus, or the like. The bus may be classified into an address bus, a data bus, a control bus, or the like.

All or some of the foregoing embodiments may be implemented by using software, hardware, firmware, or any combination thereof in the foregoing embodiments. When a software program is used to implement the embodiments, all or some of the embodiments may be implemented in a form of a computer program product. The computer program product includes one or more computer instructions. When the computer instructions are loaded and executed on the computer, all or some of the procedures or functions according to the embodiments of the present disclosure are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (digital video disc, DVD)), a semiconductor medium (for example, a solid state drive (solid state drive, SSD)), or the like.

The foregoing description about implementations allows a person skilled in the art to understand that, for ease of description and brevity, division into the foregoing functional modules is used as an example for description. In an actual disclosure, the foregoing functions can be allocated to different modules and implemented as required. In other words, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in another manner. For example, the described apparatus embodiments are merely examples. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions in the embodiments.

In addition, functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this disclosure. The foregoing storage medium includes any medium that can store program code, such as a flash memory, a removable hard disk, a read-only memory, a random access memory, a magnetic disk, or an optical disc.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A context modeling method of a split flag, applied to a video encoding device or a video decoding device, wherein the method comprises:

obtaining a height of a current node, a height of a first leaf node adjacent to the current node in a first direction, a width of the current node, and a width of a second leaf node adjacent to the current node in a second direction, wherein the first leaf node and the second leaf node are reconstructed leaf nodes;

query a preset subset index query table for a subset index of the context model of the split flag based on the height and the width of the current node; and obtaining a context model of a split flag of the current node according to an algorithm, wherein inputs of the algorithm comprise a first preset condition, a second preset condition and the subset index, wherein the first preset condition comprises that the height of the current node is greater than the height of a first leaf node, and the second preset condition comprises that the width of the current node is greater than the width of the second leaf node;

wherein the preset subset index query table comprises the following values:

| Subset Index | | Width | | | | |
|---|---|---|---|---|---|---|
| | 4 | 8 | 16 | 32 | 64 | 128 |
| Height 4 | | 4 | 4 | | | |
| 8 | 4 | 4 | 3 | 3 | | |
| 16 | 4 | 3 | 3 | 2 | 2 | |
| 32 | | 3 | 2 | 2 | 1 | 1 |
| 64 | | | 2 | 1 | 1 | 0 |
| 128 | | | | 1 | 0 | 0. |

2. The method according to claim 1, wherein an index of the context model of the split flag (ctxInc) is determined according to a sum of n_conL and n_conA, wherein n_conL represents whether the first preset condition is met, wherein when n_conL is 1 it indicates that the first preset condition is met, and when n_conL is 0 it indicates that the first preset condition is not met; and n_conA represents whether the second preset condition is met, wherein when n_conA is 1 it indicates that the second preset condition is met, and when n_conA is 0 it indicates that the second preset condition is not met.

3. The method according to claim 1, wherein an index of the context model of the split flag (ctxInc) is determined according to a sum of n_conL, n_conA, and X*A, wherein n_conL represents whether the first preset condition is met, wherein when n_conL is 1 it indicates that the first preset condition is met, and when n_conL is 0 it indicates that the first preset condition is not met; n_conA represents whether the second preset condition is met, wherein when n_conA is 1 it indicates that the second preset condition is met, and when n_conA is 0 it indicates that the second preset condition is not met; X represents the subset index of the context model of the split flag; A represents a number; and * represents multiplication.

4. The method according to claim 1, wherein the method further comprises:

obtaining a height of a third leaf node adjacent to the current node in a third direction, wherein the third direction is opposite to the first direction, and the third leaf node is a reconstructed leaf node, and wherein the inputs of the algorithm further comprises a third preset condition, wherein the third preset condition comprises the height of the current node is greater than the height of the third leaf node.

5. The method according to claim 4, wherein an index of the context model of the split flag (ctxInc) is determined according to min(n_conL+n_conA+n_conR, N−1), wherein N is an integer greater than 1; n_conL represents whether the first preset condition is met, wherein when n_conL is 1 it indicates that the first preset condition is met, and when n_conL is 0 it indicates that the first preset condition is not met; n_conA represents whether the second preset condition is met, wherein when n_conA is 1 it indicates that the second preset condition is met, and when n_conA is 0 it indicates that the second preset condition is not met; and n_conR represents whether the third preset condition is met, wherein when n_conR is 1 it indicates that the third preset condition is met, and when n_conR is 0 it indicates that the third preset condition is not met.

6. The method according to claim 4, wherein the method further comprises:

obtaining a subset index of the context model of the split flag based on the height and the width of the current node, and wherein the inputs of the algorithm further comprises the subset index of the context model.

7. The method according to claim 6, wherein the index of the context model of the split flag (ctxInc) is determined according to a sum of min(n_conL+n_conA+n_conR, N−1) and X*A, wherein n_conL represents whether the first preset condition is met, wherein when n_conL is 1 it indicates that the first preset condition is met, and when n_conL is 0 it indicates that the first preset condition is not met; n_conA represents whether the second preset condition is met, wherein when n_conA is 1 it indicates that the second preset condition is met, and when n_conA is 0 it indicates that the second preset condition is not met; n_conR represents whether the third preset condition is met, wherein when n_conR is 1 it indicates that the third preset condition is met, and when n_conR is 0 it indicates that the third preset condition is not met; X represents the subset index of the context model of the split flag; A represents a number; and * represents multiplication.

8. The method according to claim 1, wherein
the first direction is a leftward horizontal direction, and the second direction is an upward vertical direction.

9. The method according to claim 1, wherein the first preset condition further comprises that the first leaf node is available; or
the second preset condition further comprises that the second leaf node is available.

10. The method according to claim 1, wherein a coding tree to which the current node belongs is a luma coding tree or a luma-chroma joint tree.

11. A context modeling apparatus of a split flag, comprising:
at least one processor; and
a memory storing computer executable instructions for execution by the at least one processor, wherein the computer executable instructions, when executed by the at least one processor, cause the at least one processor to:
obtain a height of a current node, a height of a first leaf node adjacent to the current node in a first direction, a width of the current node and a width of a second leaf node adjacent to the current node in a second direction, wherein the first leaf node and the second leaf node are reconstructed leaf nodes;
query a preset subset index query table for a subset index of the context model of the split flag based on the height and the width of the current node; and
obtain a context model of a split flag of the current node according to an algorithm, wherein inputs of the algorithm comprise a first preset condition, a second preset condition and the subset index, wherein the first preset condition comprises that the height of the current node is greater than the height of a first leaf node, and the second preset condition comprises that the width of the current node is greater than the width of the second leaf node;
wherein the memory stores the preset subset index query table and the table comprises the following values:

| Subset Index | Width | | | | | |
|---|---|---|---|---|---|---|
| | 4 | 8 | 16 | 32 | 64 | 128 |
| Height 4 | | 4 | 4 | 4 | | |
| 8 | 4 | 4 | 3 | 3 | | |
| 16 | 4 | 3 | 3 | 2 | 2 | |
| 32 | | 3 | 2 | 2 | 1 | 1 |
| 64 | | | 2 | 1 | 1 | 0 |
| 128 | | | | 1 | 0 | 0 | and wherein the computer executable instructions cause the at least one processor to obtain the subset index of the context model of the split flag based on the height and width of the current node by querying the subset index query table.

12. The apparatus according to claim 11, wherein the computer executable instructions further cause the at least one processor to determine an index of the context model of the split flag (ctxInc) according to a sum of n_conL+n_conA, wherein n_conL represents whether the first preset condition is met, wherein when n_conL is 1, it indicates that the first preset condition is met, and when n_conL is 0, it indicates that the first preset condition is not met; and n_conA represents whether the second preset condition is met, wherein when n_conA is 1, it indicates that the second preset condition is met, and when n_conA is 0, it indicates that the second preset condition is not met.

13. The apparatus according to claim 11, wherein the computer executable instructions further cause the at least one processor to determine an index of the context model of the split flag (ctxInc) according to a sum of n_conL+n_conA+X*A, wherein n_conL represents whether the first preset condition is met, wherein when n_conL is 1, it indicates that the first preset condition is met, and when n_conL is 0, it indicates that the first preset condition is not met; n_conA represents whether the second preset condition is met, wherein when n_conA is 1, it indicates that the second preset condition is met, and when n_conA is 0, it indicates that the second preset condition is not met; X represents the subset index of the context model of the split flag; A represents a number; and * represents multiplication.

14. The apparatus according to claim 11, the computer executable instructions further cause the at least one processor to:
obtain a height of a third leaf node adjacent to the current node in a third direction, wherein the third direction is opposite to the first direction, and the third leaf node is a reconstructed leaf node, and wherein the inputs of the algorithm further comprises a third preset condition, wherein the third preset condition comprises the height of the current node is greater than the height of the third leaf node.

15. The apparatus according to claim 14, wherein the computer executable instructions further cause the at least one processor to determine an index of the context model of the split flag (ctxInc) to min(n_conL+n_conA+n_conR, N−1), wherein N is an integer greater than 1; n_conL represents whether the first preset condition is met, wherein when n_conL is 1, it indicates that the first preset condition is met, and when n_conL is 0, it indicates that the first preset condition is not met; n_conA represents whether the second preset condition is met, wherein when n_conA is 1, it indicates that the second preset condition is met, and when n_conA is 0, it indicates that the second preset condition is not met; and n_conR represents whether the third preset condition is met, wherein when n_conR is 1, it indicates that the third preset condition is met, and when n_conR is 0, it indicates that the third preset condition is not met.

16. The apparatus according to claim 14, the computer executable instructions further cause the at least one processor to:
obtain a subset index of the context model of the split flag based on the height and the width of the current node, and wherein the inputs of the algorithm further comprises the subset index of the context model.

17. The apparatus according to claim 16, wherein the computer executable instructions further cause the at least one processor to determine an index of the context model of the split flag (ctxInc) according to a sum of min(n_conL+n_conA+n_conR, N−1)+X*A, wherein n_conL represents whether the first preset condition is met, wherein when n_conL is 1, it indicates that the first preset condition is met, and when n_conL is 0, it indicates that the first preset condition is not met; n_conA represents whether the second preset condition is met, wherein when n_conA is 1, it indicates that the second preset condition is met, and when n_conA is 0, it indicates that the second preset condition is not met; n_conR represents whether the third preset condition is met, wherein when n_conR is 1, it indicates that the third preset condition is met, and when n_conR is 0, it indicates that the third preset condition is not met; X represents the subset index of the context model of the split flag; A represents a number; and * represents multiplication.

18. The apparatus according to claim 11, wherein
the first direction is a leftward horizontal direction, and
the second direction is an upward vertical direction.

19. The apparatus according to claim 11, wherein the first preset condition further comprises that the first leaf node is available; or
the second preset condition further comprises that the second leaf node is available.

20. The apparatus according to claim 11, wherein a coding tree to which the current node belongs is a luma coding tree or a luma-chroma joint tree.

21. A non-transitory computer-readable storage medium storing computer instructions, that when executed by one or more processors, cause the one or more processors to perform the steps of:

obtaining a height of a current node, a height of a first leaf node adjacent to the current node in a first direction, a width of the current node, and a width of a second leaf node adjacent to the current node in a second direction, wherein the first leaf node and the second leaf node are reconstructed leaf nodes;

query a preset subset index query table for a subset index of the context model of the split flag based on the height and the width of the current node; and obtaining a context model of a split flag of the current node according to an algorithm, wherein inputs of the algorithm comprise a first preset condition, a second preset condition and the subset index, wherein the first preset condition comprises that the height of the current node is greater than the height of a first leaf node, and the second preset condition comprises that the width of the current node is greater than the width of the second leaf node;

wherein the preset subset index query table comprises the following values:

|  | | Width | | | | | |
| --- | --- | --- | --- | --- | --- | --- | --- |
| Subset Index | | 4 | 8 | 16 | 32 | 64 | 128 |
| Height | 4 |   | 4 | 4 |   |   |   |
|  | 8 | 4 | 4 | 3 | 3 |   |   |
|  | 16 | 4 | 3 | 3 | 2 | 2 |   |
|  | 32 |   | 3 | 2 | 2 | 1 | 1 |
|  | 64 |   |   | 2 | 1 | 1 | 0 |
|  | 128 |   |   |   | 1 | 0 | 0. |

* * * * *